(12) United States Patent
Seyfi et al.

(10) Patent No.: US 12,123,719 B1
(45) Date of Patent: Oct. 22, 2024

(54) LIGHTING ADAPTIVE NAVIGATION

(71) Applicant: Alarm.com Incorporated, Tysons, VA (US)

(72) Inventors: Ahmad Seyfi, Reston, VA (US); Timon Meyer, Centreville, VA (US); Donald Gerard Madden, Columbia, MD (US); Babak Rezvani, St Petersburg, FL (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/957,184

(22) Filed: Sep. 30, 2022

Related U.S. Application Data

(63) Continuation of application No. 17/004,778, filed on Aug. 27, 2020, now Pat. No. 11,480,431.

(60) Provisional application No. 62/892,038, filed on Aug. 27, 2019.

(51) Int. Cl.
| | |
|---|---|
| *G01C 21/00* | (2006.01) |
| *B64C 39/02* | (2023.01) |
| *G01C 21/20* | (2006.01) |
| *G05D 1/00* | (2006.01) |
| *G06V 20/10* | (2022.01) |
| *B64U 101/30* | (2023.01) |

(52) U.S. Cl.
CPC .......... *G01C 21/005* (2013.01); *B64C 39/024* (2013.01); *G01C 21/206* (2013.01); *G05D 1/0088* (2013.01); *G05D 1/0202* (2013.01); *G06V 20/10* (2022.01); *B64U 2101/30* (2023.01); *B64U 2201/10* (2023.01)

(58) Field of Classification Search
CPC .. G01C 21/005; G01C 21/206; B64C 39/024; G05D 1/0088; G05D 1/0202; G06V 20/10; B64U 2101/30; B64U 2201/10
USPC .......................................... 701/532
See application file for complete search history.

(56) References Cited

U.S. PATENT DOCUMENTS

| | | | |
|---|---|---|---|
| 6,587,573 | B1 | 7/2003 | Stam et al. |
| 8,380,350 | B2 | 2/2013 | Ozick et al. |
| 8,918,208 | B1 | 12/2014 | Hickman et al. |
| 9,930,753 | B2 | 3/2018 | Balasubramanian et al. |
| 10,378,906 | B2 | 8/2019 | O'Brien et al. |
| 10,627,829 | B2 * | 4/2020 | Lin ..................... G05D 1/0234 |
| 11,324,371 | B2 | 5/2022 | Park et al. |
| 11,529,973 | B1 * | 12/2022 | Dittmer ............... G06V 10/255 |
| 2011/0026837 | A1 * | 2/2011 | Kita ...................... G06V 20/10 |
| | | | 382/209 |
| 2013/0057157 | A1 | 3/2013 | Nackaerts et al. |
| 2013/0218341 | A1 | 8/2013 | Teng et al. |
| 2014/0207282 | A1 | 7/2014 | Angle et al. |
| 2015/0302665 | A1 * | 10/2015 | Miller ..................... G06F 3/016 |
| | | | 345/419 |
| 2018/0045519 | A1 * | 2/2018 | Ghadiok .................. G06T 7/74 |
| 2018/0203448 | A1 | 7/2018 | Kim et al. |

(Continued)

*Primary Examiner* — Tuan C To
*Assistant Examiner* — Dominick Mulder
(74) *Attorney, Agent, or Firm* — Fish & Richardson P.C.

(57) ABSTRACT

Methods, systems, and apparatus, including computer programs encoded on computer-storage media, for lighting adaptive navigation. In some implementations, a method includes receiving map data associated with a property; obtaining sensor data; based on the map data and the sensor data, determining a lighting scenario; and based on the lighting scenario, configuring the robotic device.

20 Claims, 9 Drawing Sheets

(56) References Cited

U.S. PATENT DOCUMENTS

| | | |
|---|---|---|
| 2018/0215039 A1 | 8/2018 | Sinyavskiy et al. |
| 2018/0312274 A1 | 11/2018 | Kessler et al. |
| 2018/0317725 A1 | 11/2018 | Lee et al. |
| 2018/0356834 A1* | 12/2018 | Erkek ................... H05B 47/115 |
| 2018/0359416 A1* | 12/2018 | Hold-Geoffroy ...... G06V 10/82 |
| 2019/0063933 A1* | 2/2019 | Zaum ................... G05D 1/0088 |
| 2019/0164306 A1* | 5/2019 | Li ........................... G06T 7/246 |
| 2019/0295318 A1* | 9/2019 | Levinson ................ G06N 20/00 |
| 2019/0361437 A1* | 11/2019 | Wilson .................... G06F 40/58 |
| 2020/0080855 A1* | 3/2020 | Pandit ................... G05D 1/0088 |
| 2020/0103919 A1* | 4/2020 | Passmann ......... B60W 60/0015 |
| 2020/0117203 A1* | 4/2020 | Yang ................... G08G 1/0133 |
| 2020/0150695 A1* | 5/2020 | Huang ................... B64D 47/08 |
| 2020/0158876 A1* | 5/2020 | Karadeniz ............. G01S 7/4808 |
| 2020/0218290 A1* | 7/2020 | Gorsica ................ B64C 39/024 |
| 2021/0264572 A1* | 8/2021 | Hrabe .................... G06T 7/136 |
| 2021/0293963 A1* | 9/2021 | Nehmadi ............... G06V 20/64 |

\* cited by examiner

LIGHTING ADAPTIVE NAVIGATION

CROSS-REFERENCE TO RELATED APPLICATIONS

This application is a continuation of U.S. application Ser. No. 17/004,778, filed Aug. 27, 2020, which claims the benefit of U.S. Provisional Application No. 62/892,038, filed Aug. 27, 2019, and titled "LIGHTING ADAPTIVE NAVIGATION." The disclosure of each of the foregoing applications is incorporated herein by reference.

TECHNICAL FIELD

The present specification relates to lighting adaptive navigation.

BACKGROUND

Typical vision-based guidance systems will attempt to create a map based on visual features in the environment, however these features are highly dependent on lighting. Not only is sufficient lighting necessary to reveal certain trackable features, but angle of lighting, surface texture and specularity, and so on can drastically affect the two-dimensional (2D) appearance of features. Furthermore, changes in lighting can both confuse localization algorithms and degrade image quality of devices using vision to navigate. Standard auto-exposure techniques can react quite quickly to changing light to maintain acceptable image quality, but making rapid changes to auto-exposure settings can cause visual features used by odometry and localization algorithms to change or disappear, resulting in errors in pose estimation or even loss of device control.

SUMMARY

In some implementations, a system may obtain and leverage knowledge of a physical environment to optimize camera settings, scene lighting, and/or path planning to improve an ability to navigate the physical environment. The system may use the obtained knowledge to improve accuracy of pose estimation, an ability to locate specific objects in the world, and/or an overall image quality of captured video. In these implementations, the system may also leverage the particular goal assigned to or otherwise obtained by a device, such as a robot, that is attempting to navigate the physical environment. The system may use the particular goal of the device in optimizing the camera settings, the scene lighting, and/or the path planning to improve the accuracy of pose estimation, the ability to locate specific objects in the world, and the overall image quality of captured video.

In some implementations, during initial and subsequent trips through the environment, the system records not only visual features and their geometries, but also the lighting conditions in the room. Using one or more cameras and ambient light sensors of the device, the system maps the various sources of light—both artificial and natural—and associates them with the observed visual features. The system may determine that one or more of the visual features and their current appearance in the environment may be dependent on the surrounding light sources. The system may also determine that these one or more visual features can be expected to appear differently or not at all if one or more of the lighting sources associated with the one or more visual features changes.

In some implementations, the system is an onboard system. For example, the system may be onboard the device that is attempting to navigate the environment. In these implementations, the device may be a robot. In these implementations, the device may be a drone.

In one general aspect, a method includes: receiving map data associated with a property; obtaining sensor data; based on the map data and the sensor data, determining a lighting scenario; and based on the lighting scenario, determining a modification to at least one of the lighting scenario, to a planned navigation path for the robotic device, to settings for a sensor of the robotic device, to a position for a sensor of the robotic device, or to a position of the robotic device; and performing at least one action based on the one or more modifications.

Implementations may include one or more of the following features. For example, in some implementations, the method includes initiating navigation of at least a portion of the property using the robotic device; detecting, from the sensor data or the map data, a light transition area; and in response to detecting the light transition area, suspending the navigation.

In some implementations, detecting the light transition area includes detecting an area of the property that includes a dimly-lit portion and a well-lit portion.

In some implementations, the dimly-lit portion is adjacent the well-lit portion.

In some implementations, suspending the navigation includes suspending the navigation until the action is performed; and performing the at least one action includes performing one or more of the following in accordance with the one or more modifications: adjusting exposure settings of a camera of the robotic device based on the lighting scenario or the light transition; adjusting a position of a camera of the robotic device to aim the camera away from the well-lit portion or the dimly-lit portion of the light transition area; adjusting a position of the robotic device to aim a camera of the robotic device away from the well-lit portion or the dimly-lit portion of the light transition area; transmitting instructions to adjust the lighting scenario by changing a state of one or more light sources and waiting for the lighting scenario to be adjusted; requesting and receiving a different version of the map data that corresponds to the well-lit portion or the dimly-lit portion of the light transition area; or replacing the planned navigation path with a modified navigation path.

In some implementations, receiving the map data includes receiving map data that indicates multiple light sources of the property; and determining the lighting scenario includes identifying a subset of the multiple light sources that provided light indicated by the sensor data.

In some implementations, identifying a subset of the multiple light sources responsible for the lighting scenario includes: determining a current state of one or more light sources of the multiple light sources; and selecting, from among the one or more light sources, the subset of the multiple light sources for being in an on state.

In some implementations, the on state indicates that light from a corresponding light source is currently visible to a sensor of the robotic device.

In some implementations, determining the one or more modifications includes determining a modification to the lighting scenario; and performing the at least one action includes performing an action based on the determined modification to the lighting scenario.

In some implementations, determining the modification to the lighting scenario includes determining that a state of at least one light source of the property should be changed to increase light or decrease light.

In some implementations, performing an action based on the determined modification includes sending instructions to change the state of the at least one light source.

In some implementations, determining the modification includes determining a modification to the planned navigation path based on the lighting scenario; and performing the action includes navigating the robotic device along the modified navigation path.

In some implementations, determining the modification to the planned navigation path based on the lighting scenario includes determining a navigation path that avoids one or more light transition areas in the property.

In another general aspect, a method includes: obtaining sensor data using a robotic device navigating through a property; detecting one or more objects in the property from the sensor data; identifying an object of the one or more objects as a light source in a first state; transmitting instructions to modify a state of the light source from the first state to a second state; obtaining second sensor data of the light source in the second state; and updating a map of at least a portion of the property using the second sensor data.

Implementations may include one or more of the following features. For example, in some implementations, the method includes generating the map of the at least portion of the property using the sensor data, where detecting the one or more objects includes using the map to detect the one or more objects.

In some implementations, the method includes receiving a map of at least a portion of the property, where detecting the one or more objects in the property includes: identifying, from the map, locations of the one or more objects; and using the sensor data to verify the locations of the one or more objects.

In some implementations, the method includes positioning the robotic device or a camera of the robotic device to place the light source in a field of view of the camera.

In some implementations, the method includes: after transmitting instructions to modify the state of the light source from the first state to a second state, determining that a portion of a sufficiently intense light area is not visible in a field of view of a camera of the robotic device; in response to determining that the portion of the sufficiently intense light area is not visible in the field of view of the camera of the robotic device, rotating the robotic device or the camera of the robotic device in a first direction until a first edge of the sufficiently intense light area is detected; and in response to detecting the first edge of the sufficiently intense light area, rotating the robotic device or the camera of the robotic device in a second direction until a second edge of the sufficiently intense light area is detected.

In some implementations, obtaining second sensor data of the light source in the second state includes obtaining sensor data while the robotic device or the camera of the robotic device is rotating in the first direction and is rotating in the second direction.

Advantageous implementations can include one or more of the following features. Notably, the techniques disclosed in this document can be used to improve vision-based guidance of robotic devices. As an example, the disclosed system may improve vision-based guidance by recording the visual features found within an environment and their geometries along with the lighting conditions of the environment. By mapping the various sources of light within the environment and associating them with the visual features, the disclosed system can determine which visual features are dependent on which light sources. The disclosed system can further determine which visual features can be expected to look differently based on the lighting conditions, what the visual features are expected to look like given the lighting conditions, which visual features are expected to not be observable given the lighting conditions, etc., thereby improving vision-based guidance of robotic devices.

The disclosed system may further improve vision-based guidance by dynamically changing the camera settings on a robotic device such as a drone, and/or changing the lighting conditions of the environment by leveraging smart devices in order to achieve improved observation of the features within the environment Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
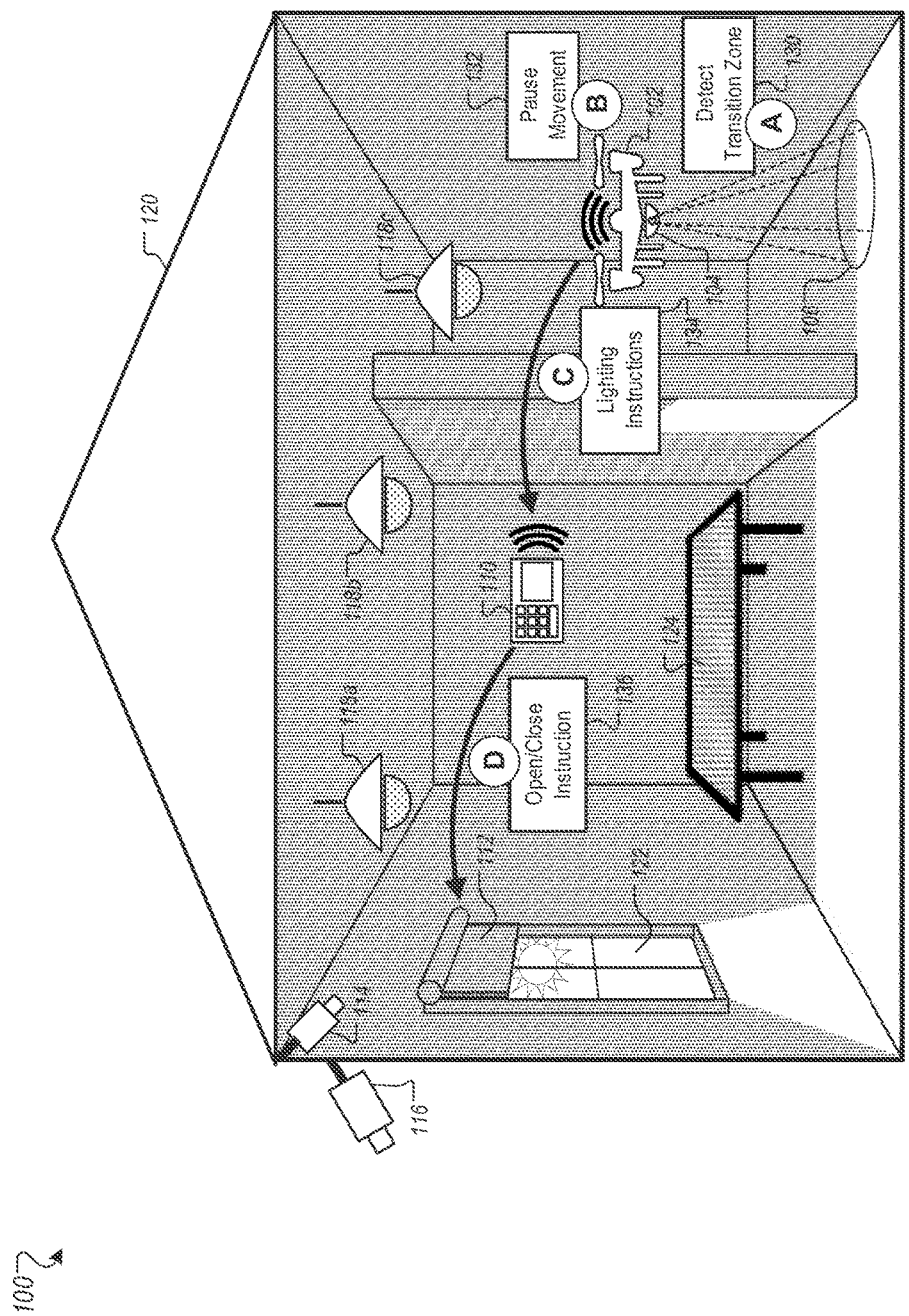
FIGS. 1A-1C are diagrams showing an example of a system for lighting adaptive navigation.
Figure 1B:
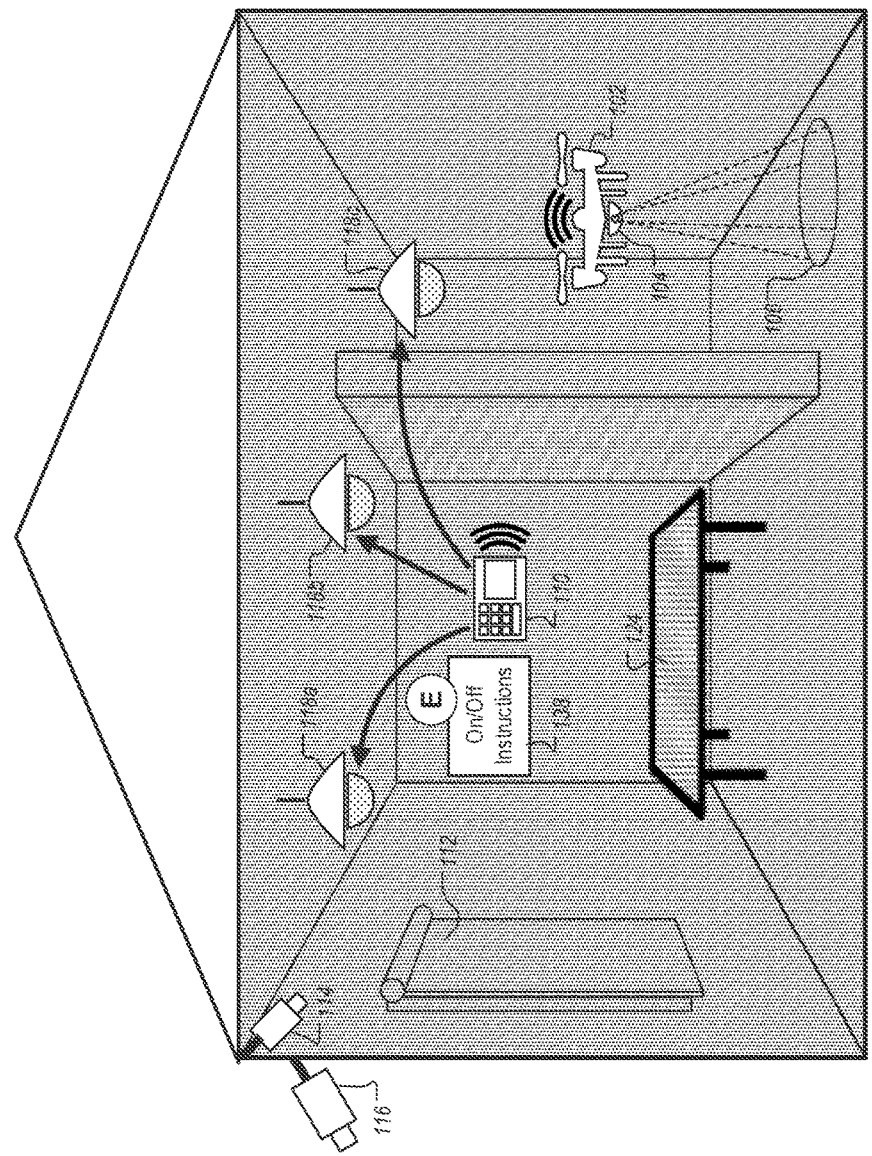
Figure 1C:
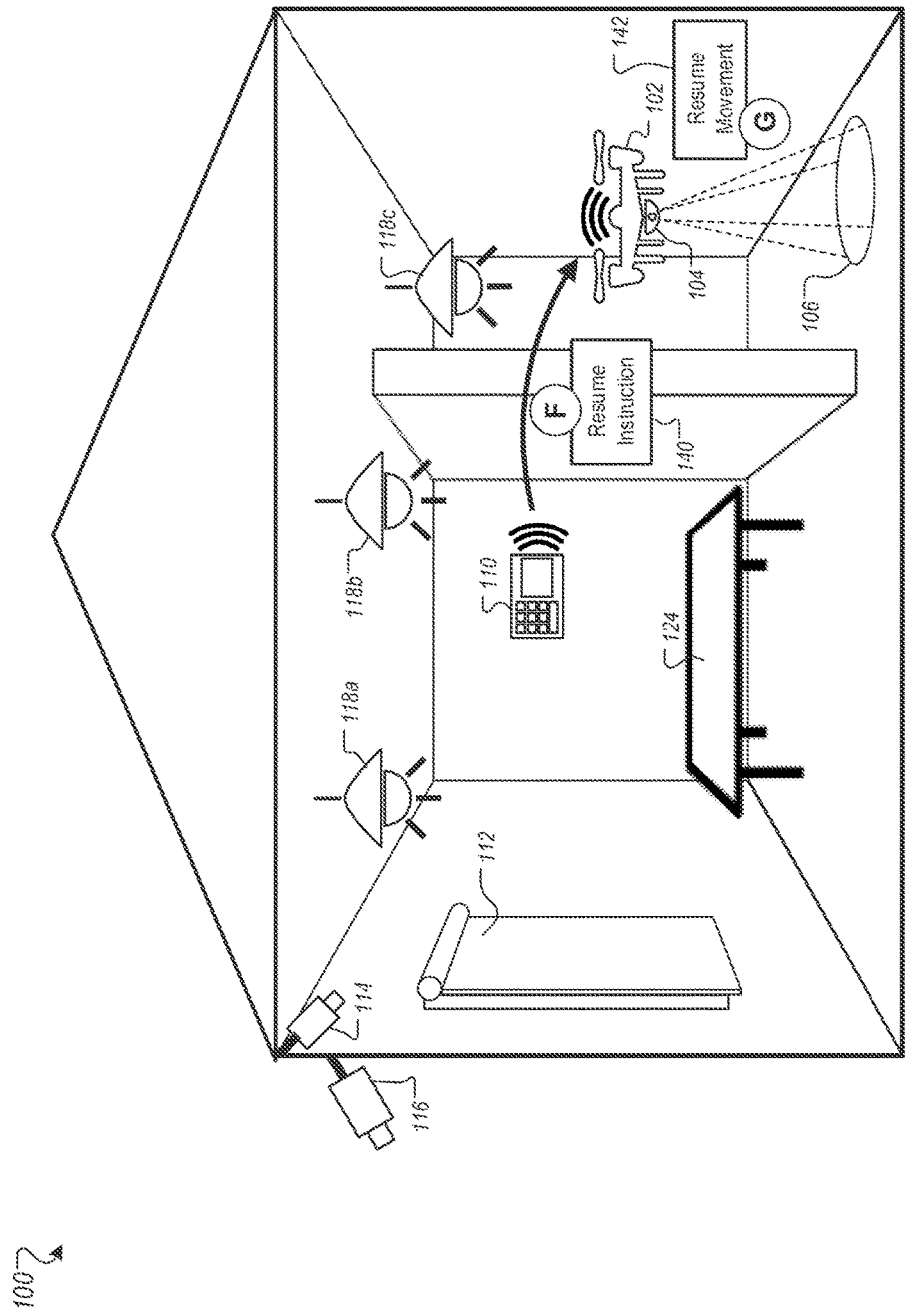

FIGS. 1A-1C are diagrams showing an example of a system 100 for lighting adaptive navigation through a monitored property 120. The system 100 includes a drone 102, a control unit 110, and one or more security devices. The system 100 may also include one or more other robotic devices, including other drones. Using the drone 102 or one or more other robotic devices, the system 100 is able to generate an environment map of the monitored property 120 that includes observed, physical objects within the environment and the light sources of the environment. The system 100 may associate various physical objects with particular lights sources. The system 100 can use these associations as well as others to improve the navigation of the drone 102 through the monitored property 120. The drone 102 can detect a lighting condition by, for example, referencing the environment map. The drone 102 can take various actions depending on the detected lighting condition.

FIGS. 1A-1C also illustrate various events, shown as stages (A) to (C), with each representing a step in an example process for lighting adaptive navigation. Stages (A) to (C) may occur in the illustrated sequence, or in a sequence that is different from the illustrated sequence. For example, some of the stages may occur concurrently.

The monitored property 120 may be any residential or commercial building such as a house, an apartment complex, an office building, etc.

The security devices may include various sensors and/or equipment. For example, as shown, the monitoring devices of the system 100 include automated window blinds 112 that are configured to open and close upon receiving a corresponding instruction, a camera 114 for monitoring at least a portion of the interior of the monitored property 120, a camera 116 for monitoring at least a portion of the exterior of the monitored property 120, and three automated lights 118a-118c that are configured to turn on and off upon receiving one or more corresponding instructions. The cameras 114 and 116 may be visible-light cameras, infrared-light (IR) cameras, or a combination of visible-light and IR cameras. The system 100 may include additional sensors and/or equipment.

The drone 102 is able to move around the monitored property 120 using multiple rotors. The drone 102 may include one or more sensors. These sensors may include, for example, a camera 104, one or more additional cameras, one or more light sensors such as one or more ambient light sensors, one or more light sources such as one or more light-emitting diodes (LEDs), and/or one or more time of flight (ToF) sensors. The camera 104 may be a visible-light camera. The one or more additional cameras may be visible-light cameras, IR cameras, or a combination of visible-light and IR cameras.

The drone 102 and the security devices may be able to communicate with the control unit 110. The drone 102 and one or more of the security devices may be able to communicate with the control unit 110 using a wireless connection, such as a Wi-Fi network, a cellular network, a Bluetooth network, etc. One or more of the security devices may be able to communicate with the control unit 110 using a wired connection.

In some implementations, the drone 102 may be able to directly communicate with one or more of the security devices through a wireless connection.

In some implementations, a robotic device instead of the flying drone 102 may be used to monitor the property. In these implementations, the robotic device may be a land-based device that can navigate, for example, using one or more wheels and/or legs.

In general, a light source refers to a detected area in a camera's field of view that is determined to have sufficient brightness or luminosity. An area may be classified as a light source if it is brighter or more luminous than at least some other areas in the camera's field of view. For example, an area may be classified as a light source if it is brighter or more luminous than at least, for example, 50%, 60%, 70%, 80%, 90%, 100%, etc. of the other areas in the camera's field of view. An area may be classified as a light source if the detected brightness or luminosity meets a threshold level of brightness or luminosity. An area may be classified as a light source if it causes areas of the image taken by the camera to clip or be overexposed. A light source may be classified as a direct light source, e.g., a lamp, the sun, overhead lighting, etc., or as an indirect light source. An indirect light source may be any surface of a feature with the ability to reflect a sufficient amount/intensity of light from a direct light source. The camera may be the camera 104. The drone 102 and/or the control unit 110 may determine whether a detected area in the camera 104's field of view is a light source.

As described in more detail below, a direct light source creating an indirect light source may or may not be visible to the camera 104. The drone 102 and/or the control unit 110, may infer the position of the indirect light source based on the position of the direct light source and/or the position of the drone 102. For example, as the drone 102 moves, the reflection of a lamp on a wall will move down the wall. This phenomenon can be used by the drone 102 and/or the control unit 110 to identify an indirect source As shown in FIGS. 1A-1C, the drone 102 and/or the control unit 110 may classify and/or may have already classified the sun coming through a window 122, the window 122, and/or the lights 118a-118c as direct light sources. As will be discussed in more detail below, these direct light sources may be included, by the drone 102 and/or the control unit 110, on one or more environment maps for the monitored property 120. The drone 102 and/or the control unit 110 may classify and/or may have already classified the sunlight reflecting off the floor and the walls of the monitored property 120 as an indirect light source. As will be discussed in more detail below, these indirect light sources may be included, by the drone 102 and/or the control unit 110, on one or more environment maps for the monitored property.

The environments maps generated and updated by the system 100 may include visual features of the monitored property 120, the light sources within the monitored property 120, and an indication of how those visual features and light sources are associated, e.g. a lamp is a visual features that serves as a direct light source when it is on.

The techniques disclosed in this document can be used to improve vision-based guidance of robotic devices. The system 100 improves vision-based guidance by recording the visual features found within an environment and their geometries along with the lighting conditions of the environment. By mapping the various sources of light within the environment and associating them with the visual features, the system 100 can determine which visual features are dependent on which light sources. The system 100 can further determine which visual features can be expected to look differently based on the lighting conditions, what the visual features are expected to look like given the lighting conditions, which visual features are expected to not be observable given the lighting conditions, etc., thereby improving vision-based guidance of robotic devices. The system 100 further improves vision-based guidance by dynamically changing the camera settings on a robotic device such as the drone 102, and/or changing the lighting conditions of the environment by leveraging smart devices in order to allow for better observation of the features within the environment.

FIG. 1A shows the system 100 where the drone 102 has started navigating through the monitored property 120. As shown, the blinds 112 are currently in an up or open position, and each of the lights 118a-118c are currently off. The light coming through the window 122 has created a number of light transition zones, where a dimly-lit area of the monitored property 120 quickly transitions to a well-lit area of the monitored property 120. Such transition zones can cause numerous issues during vision-based navigation. For example, such transition zones may result in overexposing the camera 104's sensor preventing the drone 102 from observing various features within the monitored property 120. This may result in the drone 102 unintentionally deviating from its planned path, in contact between the drone 102 and a feature of the monitored property 120, and/or to the drone 102 crashing. Accordingly, the drone 102 is configured to take one or more actions when such transition zones are detected and/or anticipated.

The system 100 may have provided the drone 102 a goal. For example, the system 100 may have provided the drone 102 a goal to map the entire monitored property 120 including all objects within the property, e.g. to generate or update an environment map. Accordingly, in navigating the monitored property 120, the drone 102 may need to capture images for the all the walls, floors, and objects, such as a table 124, of the monitored property 120 using the camera 104 and/or other onboard sensors or equipment. Other goals that the system 100 may provide to the drone 102 may include, for example, detecting the position of a base station, detecting the position of a person, navigating through a door, navigating through a room, etc. In providing a goal to the drone 102 to track a particular person or object, the system 100 may choose a navigation path for the drone 102 that would avoids backlighting the person or object in question by optimizing the angle of approach. Specifically, this path may be chosen by the drone 102 itself or by the control unit 110.

In navigating through the monitored property 120, the drone 102 may refer to a previously generated environment map for the monitored property 120 or for that particular section of the monitored property 120. The environment map(s) may be stored on the drone 102. The environment map(s) may be stored externally with respect to the drone 102 and/or with respect to the system 100. Where the environment map(s) are stored externally, the drone 102 may request an environment map from the control unit 110. Alternatively, the system 100, e.g. the control unit 110, may have sent the drone 102 an environment map. The system 100, e.g. the control unit 110, may have sent the drone 102 an environment map in response to determining that the drone 102 preparing to navigate the monitored property 120 or had started navigating the monitored property 120.

In referring to an environment map for the monitored property 120 during navigation of the monitored property 120, the drone 102 may compare its observations obtained through the camera 104. For example, the drone 102 may obtain a picture through the camera 104 having a field of view 106. The drone 102 may then compare this picture with the environment map, e.g. with the its expected location on the environment map The drone 102 may request, store, and/or refer to a different environment map based on the detected lighting conditions such as the detected luminosity of the monitored property 120, or the detected brightness of the monitored property 120. For example, prior to detecting the transition zone within its field of view 106, the drone 102 may have detected that the hallway had a particular luminosity or brightness, e.g. a relatively low brightness. Accordingly, the drone 102 may have requested, stored, and/or referred to a first environment map of the monitored property 120 associated with brightness or luminosity range that the detected brightness or luminosity was within. There may be environment maps generated for the monitored property 120 that are associated with, for example, the detection of very low light/dark conditions, low light conditions, low-to-moderate light conditions, moderate light conditions, moderate-to-bright light conditions, bright light conditions, etc. Similarly, there may be different environment maps depending on whether the detected light is determined to include only natural light, only artificial light, or a combination of natural and artificial light. In some implementations, lighting conditions for the monitored property 120 may be detected using sensors not located on the drone 102. For example, the system 100 may detect the current lighting conditions of all or part of the monitored property 120 using the camera 114. Camera data from the camera 114 may be provided to the control unit 110 which may use the data to determine the current lighting conditions for all or part of the monitored property 120. Camera data from the camera 114 and/or lighting conditions based on the camera 114's camera data may be accessed by the drone 102.

The drone 102 may request, store, and/or refer to a different environment map based on the location of the drone 102 within the monitored property 120. For example, the drone 102 may request, store, and/or refer to a first environment map for the hallway of the monitored property 120. Upon reaching the transition zone, the drone 102 may request, store, and/or refer to a second environment map for the room that includes the window 122 and a table 124.

The drone 102 may request, store, and/or refer to a different environment map based on the time of day and/or the time of year. For example, the drone 102 may currently be referring to an environment map that is associated with the time of year that encompasses the current date and with a time period which encompasses the current time of day. There may be different environment maps for different times of year and/or times of day due to the effect that sunlight can have on an environment. For example, the time of day and/or the time of year may affect the amount/intensity of light and the angle of light coming through the window 122. There may be environment maps for different time periods throughout the day. For example, there may be an environment map for every 30 minutes, hour, every two hours, or every six hours of the day. There may be environment maps for particular times of the year. For example, there may be an environment maps that are associated with the spring, the summer, the fall, and the winter. Here, for example, the drone 102 may be referring to an environment map associated with the summer and for the period of time between 4:00 and 8:00 pm.

The drone 102 may request, store, and/or refer to a different environment map based on the current weather. For example, the drone 102 may currently be referring to an environment map that is associated with a sunny day. There may be different environment maps for different weather conditions, e.g., overcast, raining, storming, scattered storms, snowing, partly cloudy, mostly sunny, sunny, etc., due to the effect that weather can having on light conditions within the monitored property 120. For example, the amount/intensity of light coming through the window 122 may be greater during a sunny day than during an overcast day. The system 100 may determine the current weather by requesting weather data from an external weather system. The system 100 may estimate the weather using one or more sensors or pieces of equipment that are part of the system 100. For example, the system 100 may use the camera 116 to determine that it is relatively dark outside for that time of day. Accordingly, using the camera 116, the system 100 may estimate that the weather is overcast. This weather information may be obtained and/or stored on the control unit 110. This weather information may be accessed by the drone 102.

The drone 102 may request, store, and/or refer to different environment maps based on a combination of one or more of the detected lighting conditions, the location of the drone 102, the time of day, the time of year, and/or the current weather conditions.

In some implementations, the drone 102 may refer to a single environment map for the monitored property 120. In these implementations, the drone 102 may make adjustments to the environment map based on, for example, the detected lighting conditions, based on the location of the drone 102, based on the time of day, based on the time of year, and/or based on the current weather conditions. For example, the drone 102 may remove visual features from the environment map that are less likely to be observable given the current lighting conditions of the monitored property 120.

In some implementations, the drone 102 may refer to a single environment map for the monitored property 120. In these implementations, the drone 102 may make choose to ignore certain visual features within the environment map based on, for example, the detected lighting conditions, based on the location of the drone 102, based on the time of day, based on the time of year, and/or based on the current weather conditions. For example, the drone 102 may choose to ignore visual features that are less likely to be observable given the current lighting conditions of the monitored property 120.

As will be discussed in more detail below with respect to FIGS. 2A-2B, the drone 102 may use the one or more environment maps to determine a navigation path to take through the monitored property 120. In some implementations, the drone 102 starts with a first, e.g. preset, path that is updated or modified using an environment map based on detected lighting conditions.

While navigating through the monitored property 120, the observations of the drone 102 may be used, e.g. by the drone 102 or by the control unit 110, to update one or more of the environment maps as will be discussed in more detail below with respect to FIGS. 3A-3B.

In stage (A), the drone 102 detects a transition zone (130) using its camera 104. Here, the drone 102 detects the transition zone when the camera 104's field of view 106 includes the transition from a dimly-lit area to a well-lit area. The drone 102 may use other sensors to detect and/or verify the transition zone. For example, the drone 102 may use one or more ambient light sensors, and/or one or more other cameras to detect the transition zone. As another example, the drone 102 may use one or more ambient light sensors, and/or one or more other cameras to verify the existence of the transition zone.

The existence of the transition zone may be dependent on, for example, the time of day, the time of year, the weather, the blinds 112 being open, and/or the lights 118a-118c being off.

In some implementations, the drone 102 may have anticipated the transition zone (130). In these implementations, the drone 102 may have anticipated the transition zone by determining that its navigation path would lead it towards the transition zone or into the transition zone. The drone 102 may make this determination by referring to one or more environment maps and comparing its current navigation path with the one or more environment maps.

In stage (B), based on the detection or anticipation of a transition zone, the drone 102 performs a remedial action. As shown, in response to detecting the transition zone, the drone 102 may pause its movement such that is stays in substantially the same place for a period of time (130). The drone 102 may use this period of time, for example, to adjust the exposure settings of the camera 104, to adjust the exposure settings for another onboard camera, to acquire a new environment map for well-lit areas, to determine and generate instructions to send to the control unit 110, to determine one or more additional actions to take, and/or to determine or acquire a new navigation path, e.g. in order to avoid the transition zone. The adjustment of the exposure settings of the camera 104 may include adjusting the aperture of the camera 104, adjusting a shutter speed or integration time of the camera 104, and/or adjusting the camera 104's ISO sensitivity. As an example, where the drone 102 includes multiple cameras, the drone 102 can use observed conditions, e.g. the detection of a transition zone, in the field of view 106 of the camera 104 to plan exposure changes for the other one or more cameras before those one or more cameras necessarily observe those conditions in their own field of views.

The drone 102 may take additional or alternative remedial actions in anticipation of the transition zone. These remedial actions may include, for example, the drone 102 changing is trajectories or poses such that the camera 104 would not be directly pointed at the transition zone or at a light source, e.g. a direct or indirect light source. Pointing the camera 104 directly at a light source may cause part or all of the images taken by the camera 104 to become overexposed which may make it difficult or impossible for the drone 102 to track one or more visual features of the monitored property 120. In addition, pointing the camera 104 directly at a direct light source may result in the camera 104 capturing images containing lens flare or blooming. The drone 102 may mistakenly treat the captured lens flare or blooming as visual features of the monitored property 120 and start tracking them.

Here, the well-lit area of the floor of the monitored property 120 may be determined to be an indirect light source. Accordingly, the drone 102, in anticipation of the transition zone or the indirect light source, may change its trajectories or poses such that the camera 104 is not pointed at the floor of the monitored property 120 when it reaches the transition zone, e.g. such that the field of view 106 of the camera 104 would not encompass any part of the transition zone or would encompass no more than a given percentage of the camera 104's field of view 106 (e.g., no more than 10%, 20%, 30%, 40%, 50%, 60%, etc.). Similarly, the drone 102, in anticipation of the transition zone or the indirect light source, may change the angle of the camera 104, e.g. where the angle of the camera 104 is independently adjustable, so that the camera 104 is not directly pointed at the floor of the monitored property 120 when it reaches the transition zone, e.g. such that the field of view 106 of the camera 104 would not encompass any part of the transition zone or would not be centered on the transition zone. By adjusting the pose of the drone 102 and/or the camera 104 prior to reaching the transition zone, the drone 102 may not need to pause its movement when it reaches the transition zone.

These remedial actions may also include, for example, the drone 102 switching to visual feature tracking with one or more cameras other than the camera 104. For example, once the drone 102 detects the transition zone in the field of view 106 of the camera 104, the drone 102 may start feature tracking primarily or solely with one or more cameras other than the camera 104. The drone 102 may also use the pose of the camera 104 and the location of the detected transition zone in order to position the drone 102 and/or the one or more other cameras in such as way so that the one or more other cameras avoid the transition zone. By switching to visual feature tracking with one or more cameras other than the camera 104 prior to one or more other cameras reaching the transition zone, the drone 102 may not need to pause its movement when it reaches the transition zone.

These remedial actions may also include, for example, the drone 102 turning on one or more onboard lights. For example, by turning on one or more onboard lights prior to reaching the transition zone, the drone 102 may help the camera 104 and/or other sensors, e.g. one or more ambient lights sensors, to adjust to the brighter area before the drone 102 and/or the sensors reach the transition zone. By turning on one or more onboard lights, the drone 102 may not need to pause its movement when it reaches the transition zone.

These remedial actions may also include, for example, the drone 102 choosing to track only a particular subset of visual features or referring to an environment map that includes only the particular subset of visual features. For example, the drone 102 may determine, e.g. by referring to one or more environment maps, that it is approaching a transition zone or an overexposed area, or that its camera 104 is going to be directly pointed at a light source. In this example, the drone 102 may anticipate that part of the images taken by the camera 104 may be overexposed. Accordingly, the drone 102 may choose to ignore visual features that are less likely to be identifiable, e.g. visual features that are likely to be "washed out" by the overexposure. In doing this, the drone 102 continues to navigate through the monitored property 120 using only those visual features that are likely to continue to be trackable. Accordingly, the drone 102 may use only those features that are determined to be less sensitive to various lighting conditions. As will be discussed in more detail below with respect to FIGS. 3A-3B, using information previously collected about the surfaces of visual features and light sources, the system 100 would be able to provide information about the sensitivity of each visual feature point to lighting conditions. In addition, tracking only these less sensitive features may require less processing power on part of the drone 102 since the drone 102 will have fewer features to track, and may be able to use simpler feature extraction and matching methods during its navigation. Additionally, using these more stable features may contribute to fewer errors in matching, e.g. matching features from the camera 104's view to the one or more environment maps, and thus provide a more certain and/or accurate pose estimation of the drone 102 and/or the camera 104.

The drone 102 may quickly capture multiple images at different exposures, or different levels of controlled lighting, from approximately the same pose in order to shift tracking from one visual feature set to another without inducing drift. For example, if the drone 102 and/or the control unit 110 determines that the drone 102 should navigate using only those visual features that are less sensitive to various lighting conditions, then the drone 102 may pause its movement and capture multiple images at different exposures when switching, for example, from a full visual feature set to a visual feature set containing only those less sensitive visual features.

Similarly, the drone 102 may refer to an environment map that does not contain the visual features of the monitored property 120 that are less likely to be identifiable, e.g. visual features that are likely to be "washed out" by the overexposure. By choosing to track only a particular subset of visual features or referring to an environment map that includes only the particular subset of visual features, the drone 102 may not need to pause its movement when it reaches the transition zone.

These remedial actions may also include, for example, the drone 102 choosing to ignore particular features in the monitored property 120 that it may detect. For example, the drone 102 may determine, e.g. by referring to one or more environment maps, that it is approaching an area where the camera 104 will be directed to a direct light source. Having the camera 104 pointed at a direct light source may result in capturing images containing lens flare or blooming. The drone 102 may anticipate the detection of such lens flare or blooming features within the images and choose to ignore such features so that it does not mistakenly track those features. The drone 102 may ignore these features by, for example, identifying the lens flare or blooming using image or pattern recognition. The drone 102 may ignore these features by, for example, selecting visual features to track that are unlikely to be substantially affected by any lens flare or blooming.

These remedial actions may also include, for example, the drone 102 changing the exposure settings of the camera 104 in anticipation of particular lighting conditions, e.g. reaching the transition zone. By taking into account the current observed lighting conditions and/or one or more environment maps containing lighting sources, the drone 102 and/or the control unit 110 can coordinate camera exposure settings with the planned trajectory of the drone 102 in order to smooth changes in exposure. For example, as the camera 104 is approaching a brighter area, e.g. as determined by the drone 102 and/or the control unit 110 by referring to one or more environment maps, it can proactively begin to ramp down the integration time of the camera 104 to avoid a discontinuity in image quality or feature tracking.

Using this approach, the drone 102 may adjust the exposure settings of the camera 104 prior to reaching the transition zone, e.g. while approaching the transition zone. The drone 102 may adjust, for example, the exposure settings to prevent the camera 104 sensor from being overexposed. For example, the drone 102 may increase the camera 104's shutter speed, reduce the size of the camera 104's aperture, and/or lower the camera 104's ISO sensitivity to prevent the camera 104 from becoming overexposed as it reaches the transition zone, e.g. to modify the camera 104's exposure settings for a well-lit area. The drone 102 and/or the control unit 110 may determine the exposure settings for the camera 104 by referring to one or more environment maps. By adjusting the exposure settings of the camera 104 prior to reaching the transition zone, the drone 102 may not need to pause its movement when it reaches the transition zone.

In stage (C) the drone 102 generates and sends instructions to the control unit 110 in order to change the lighting conditions of the monitored property 120 (134). These instructions may indicate actions that should be taken by one or more pieces of equipment and/or sensors of the system 100 or state changes for one or more pieces of equipment and/or sensors of the system 100. The instructions are sent to the control unit 110 for the control unit 110 to carry out. Here, the instructions sent by the drone 102 to the control unit 110 may include instructions for the control unit 110 to close the blinds 112, and to turn on the lights 118a-118c.

Generating and sending the instructions to the control unit 110 (134) by the drone 102 may be accordance with prior learning embedded in the environment map. For example, based on the conditions, e.g., the detected lighting conditions, the location of the drone 102, the time of day, the time of year, and/or the current weather conditions, prior learning embedded in the environment map may indicate that the blinds 112 should be closed and that the lights 118a-118c should be turned on.

In some implementations, generating and sending the instructions to the control unit 110 (134) by the drone 102 may be done dynamically by the drone 102 providing instructions for changed lighting conditions until the desired visual features are detectable. For example, in these implementations, the drone 102 may send instructions to the control unit 110 to close the blinds 112. Once the blinds 112 are closed, the drone 102 may check to which visual features it can detect. If one or more visual features cannot be detected, the drone 102 may send a second set of instructions to the control unit 110 to turn on the lights 118a-118c.

In some implementations, the drone 102 can send instructions directly to one or more pieces of equipment and/or sensors of the system 100. For example, the drone 102 may be able to wirelessly communicate with the blinds 112, and be able to send open/close instructions to the blinds 112.

In some implementations, instead of sending instructions to the control unit 110, the drone 102 may send an indication of the detected lighting conditions. For example, the drone 102 may send an indication that it has detected a transition zone or an overexposed area. In these implementations, the control unit 110 may determine what actions to take with regard other equipment and/or sensors of the system 100.

In stage (D), the control unit 110 sends an instruction to a piece of equipment and/or a sensor of the system 100 in order to change a lighting condition of the monitored property 120 (136). Here, the instruction sent is an open/close instruction that is sent by the control unit 110 to the blinds 112. Because the blinds 112 are currently open, the open/close instruction will result in the blinds 112 closing. Closing the blinds 112 will result in removing the transition zones within the monitored property 120 and the well-lit or overexposed areas, e.g. areas that are likely to result overexposed images, of the monitored property 120 that were created by the sunlight coming through the window 122. However, closing the blinds 112 may result in all or part of the monitored property 120 becoming a dimly-lit or underexposed area, e.g. an area that is likely to result in underexposed images.

In FIG. 1B, the blinds 112 have been closed in accordance with the instructions sent by the control unit 110. As shown, closing the blinds 112 has resulted in removing the transition zones within the monitored property 120 and the well-lit or overexposed areas, e.g. areas that are likely to result overexposed images, of the monitored property 120 that were created by the sunlight coming through the window 122. As shown, closing the blinds 112 has also resulted in all or part of the monitored property 120 becoming a dimly-lit or underexposed area, e.g. an area that is likely to result in underexposed images.

Although the lack of transition zones within the monitored property 120 provides some navigation benefits for the drone 102, the drone 102 may continue to have difficulty navigating the monitored property 120 due to the area being dimly-lit or underexposed. Accordingly, images taken by the camera 104 may be underexposed, resulting in some or all of the visual features of the monitored property 120 being undetectable by the sensors of the drone 102.

The drone 102 may have anticipated that closing the blinds 112 would result in the monitored property 120 becoming a dimly-lit or underexposed area. Accordingly, the instructions sent by the drone 102 to the control unit 110 in stage (C) may have included instructions for the control unit 110 to turn on the lights 118a-118c.

Alternatively, the drone 102 may proceed with navigating the monitored property 120 using, for example, one or more onboard lights, e.g. one or more LEDs, despite the monitored property 120 becoming a dimly-lit or underexposed area. However, given that the drone 102's current goal is to map the entire monitored property 120 including all objects within the property, it may be preferable to improve the lighting conditions of the monitored property 120 instead of relying on the drone 102's onboard light(s). For example, relying on the onboard light(s) may result in a slower mapping process, e.g., may need to get closer to visual features, may be limited to using only one camera, etc., or may result in less accurate or detailed images being captured, e.g. due to potential light output limitations of the onboard lights. As another example, the onboard lights can also introduce their own lighting issues, since there may be shadows on objects which are uniquely created by the onboard lighting, and that move as the drone 102 moves.

In stage (E), the control unit 110 sends instructions to one or more different pieces of equipment and/or sensors of the system 100 in order to change a lighting condition of the monitored property 120 (138). Here, the control unit 110 sends on/off instructions to each of the lights 118a-118c. Because each of the lights 118a-118c are off, the on/off instructions will result in each of the lights 118a-118c turning on. Turning on the lights 118a-118c will produce improved lighting conditions for the monitored property 120 such that the monitored property 120 will no longer be dimly-lit or underexposed. Accordingly, turning on the lights 118a-118c may result in a more robust set of visual features of the monitored property 120 being detectable by the drone 102's sensors.

Furthermore, based on prior learning embedded in the one or more environment maps, the drone 102 and/or control unit 110 can expect improved lighting conditions as a result of turning on the lights 118a-118c, e.g. can expect that no transition zones of extremes of lighting will be generated as result of turning on the lights 118a-118c.

In FIG. 1C, the lights 118a-118c have been turned on in accordance with the instructions sent by the control unit 110. As shown, turning on the lights 118a-118c has resulted in the monitored property 120 no longer being a dimly-lit or underexposed area. Accordingly, the drone 102 may now be able to detect a more robust set of visual features using one or more of its sensors such as the camera 104. Also, as shown, the blinds 112 remain closed.

In stage (F), the control unit 110 sends a resume instruction or a confirmation to the drone 102 (140). The resume instruction or confirmation may indicate that the instructions previously provided by the drone 102 in stage (C) have been carried out. Accordingly, the resume instruction or confirmation may indicate that the blinds 112 have been closed and that the lights 118a-118c have been turned.

In stage (G), the drone resumes movement to continue its navigation through the monitored property 120 (142).

Figure 2A:
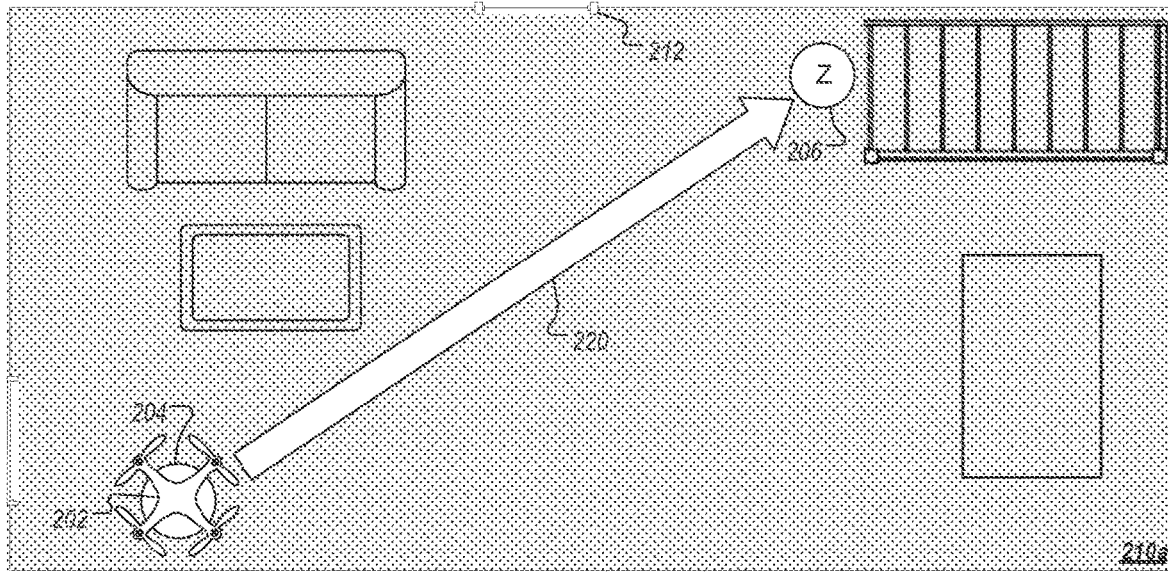
FIGS. 2A-2B are diagrams showing an example process for planning a path using lighting adaptive navigation and dynamically updating a path based on detected light conditions.
Figure 2B:
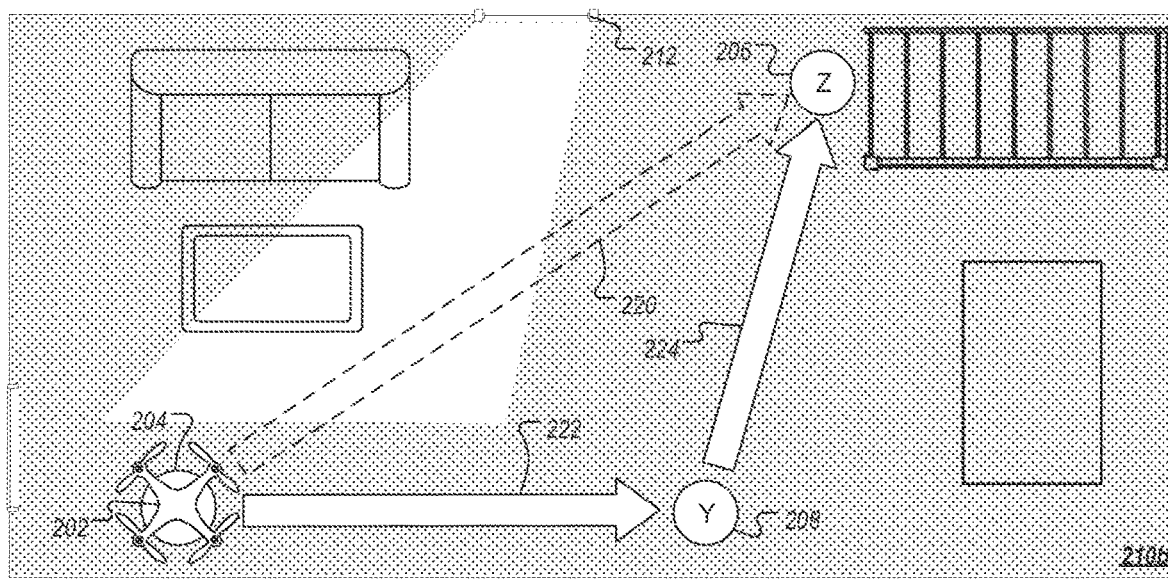

FIGS. 2A-2B are diagram showing an example process for planning a path using lighting adaptive navigation and dynamically updating a path based on detected light conditions.

As shown in FIG. 2A, the drone 202 is currently at a first location 204. The first location 204 may be a base station for the drone 202. The drone 202 may have a goal of reaching a second location 206 ("Z"). The goal may have been provided by the system 100 shown in FIGS. 1A-1C, by part of the system 100, e.g. by the control unit 110 or determined by the drone 202 itself, or by the monitoring system 600 shown in FIG. 6. The drone 202 may be the drone 102 as shown in FIGS. 1A-1C.

Here, the system or part of the system, e.g. the drone 102 and/or the control unit 110 shown in FIGS. 1A-1C, may have chosen a direct path 220 from the first location 204 to the second location 206 based on the lighting conditions of the room 210a having a window 212. The system or part of the system, e.g. the drone 102 and/or the control unit 110, may have chosen the direct path 220 further based on a direct path being the most efficient route. The system or part of the system, e.g. the drone 102 and/or the control unit 110, may have chosen the direct path 220 further based on there being no obstacles in the way of the path 220. The system or part of the system, e.g. the drone 102 and/or the control unit 110, may determine that there are no obstacles along the path 220 by referring to an environment map for the room 210a.

In regards to the lighting conditions of the room 210a, as shown, the room 210a does not appear to have any transition zones between extremes of lighting, any overexposed areas, and any underexposed areas. These lighting conditions may be determined based on one or more sensors, such as camera, onboard the drone 202, and/or one or more external sensors or pieces of equipment that are part of a monitoring system, e.g. the system 100 shown in FIGS. 1A-1C or the system 600 shown in FIG. 6.

In FIG. 2B, the lighting conditions in the room 210b have changed with respect to the lighting conditions shown in FIG. 2A. As shown, sunlight is now coming through the window 212, resulting in a portion of the room 210b becoming an overexposed area and in multiple transition zones with respect to the path 220.

Using the one or more onboard sensors, the drone 202 may detect the location of the overexposed area. For example, the drone 202 may detect lighting transition zones between the overexposed area and non-overexposed areas of the room 210b, thereby, for example, determining one or more edges of overexposed area. The drone 202 may additionally or alternatively access data from one or more external sensors or pieces of equipment that are part of a monitoring system in determining the locations of the one or more edges of the overexposed area.

Using the location of the overexposed area, the system or part of the system, e.g. the drone 102 and/or the control unit 110 shown in FIGS. 1A-1C, may determine a new path 222 for the drone 102 to a location 208. The system or part of the system, e.g. the drone 102 and/or the control unit 110, may additionally refer to an environment map for the room 210b to confirm that there would be no problematic lighting conditions along the path 222, e.g. no transition zones or physical objects in the along the path 222. The environment map for the room 210b may be the same as the environment map for the room 210a.

Using the location of the overexposed area and the environment map for the room 210b, the system or part of the system, e.g. the drone 102 and/or the control unit 110 shown in FIGS. 1A-1C, may determine another path 224 between the location 208 and the final location 206. The system or part of the system, e.g. the drone 102 and/or the control unit 110, may have determined the paths 222 and 224 to provide the drone 102 a navigable route to the final location 206 while assuring that the drone 102 avoids the overexposed area.

In determining a path for the drone 202 to navigate, the system or part of the system, e.g. the drone 202 and/or the control unit 110 shown in FIGS. 1A-1C, may determine a series of three dimensional coordinates for the drone 202 to follow, e.g. X, Y, and Z coordinates. In determining a path for the drone 202 to navigate, the system or part of the system may determine one or more poses for the drone 202 or its camera(s) throughout the planned navigation along the path. For example, the system or part of the system may determine a particular pose for the drone 202 at every determined coordinate, at every other determined coordinate, at every third determined coordinate, etc. The pose of the drone 202 may include a position and orientation of the drone 202. The pose of the drone 202's camera(s) may include one or more positions and orientations of the camera (s). The pose of the drone 202 and its camera(s) may include a horizontal angle of the drone 202, e.g. a rotation of the drone 202, a vertical angle of the drone 202, a horizontal angle of a camera of the drone 202, a vertical angle of a camera of the drone 202, etc.

In some implementations, for a particular goal given to the drone 202—such as detecting the position of a base station or a person, or navigating through a door—a path would be chosen, e.g. by the drone 202 itself or by the control unit 110 shown in FIGS. 1A-1C, that avoids backlighting the object, e.g. the person, the base station, the door, etc., in question by optimizing the angle of approach.

In some implementations, if an overexposed or an underexposed area—with, therefore, very few trackable features—is either predicted or detected, the system or part of the system, e.g. the drone 202 and/or the control unit 110 shown in FIGS. 1A-1C, should plot a path for the drone 202 such that the area occupies no more than a given percentage of the drone 202's camera(s)'s field of view, e.g. no more than 5%, 10%, 20%, 30%, 40%, 50%, 60%, etc. For instance, if the drone 202 is approaching a white wall at the end of a dark hallway, it may elect to turn to the side slightly to keep some portion of the hallway, and thus reliably trackable visual features, in the field(s) of view of its camera(s).

In some implementations, the system or part of the system, e.g. the drone 202 and/or the control unit 110 shown in FIGS. 1A-1C, chooses a path for the drone 202 that avoid areas or poses where the drone 202 may have difficulty detecting features given the current lighting conditions or the anticipated lighting conditions, e.g. given previous observations, time of day, and system state. For example, the drone 202 might choose to plot a path through a well-lit part of the room, e.g. the room 210b, where it has previously seen little variation in detected features due to lighting intensity or source, while avoiding a dimly lit section where visual features are known to be scarce given the current lighting conditions or where there is little correlation at all between lighting conditions and observed/detected visual features.

In some implementations, in determining a path for the drone 202, the system or part of the system, e.g. the drone 202 and/or the control unit 110 shown in FIGS. 1A-1C, chooses a path that avoid areas where the lighting has greater variability or is less predictable based on current observations.

In some implementations, in determining a path for the drone 202, the system or part of the system, e.g. the drone 202 and/or the control unit 110 shown in FIGS. 1A-1C, selects a path that minimizes transitions between extremes of lighting, e.g. avoids transition zones, or takes these transitions into account during trajectory planning, e.g. by preparing the exposure settings of the drone 202's onboard camera(s) for these transitions. For example, the drone 202 may slow or even stop in order to adjust exposure for one or more of its cameras to the new lighting conditions during a lighting transition. In this example, the drone 202 may transition from looking for one set of visual features, e.g. consisting of the visual features that it can detect in the well-lit areas, to another set of visual features, e.g. consisting of the visual features that it can detect in darker areas. By slowing or even stopping and/or by transitioning between sets of visual features, the drone 202 can avoid drifting with respect to a global coordinate frame.

In some implementations, the drone 202 may include multiple cameras. In these implementations, one of the cameras on the drone 202 may be used for visual odometry while another camera is used for other purposes. In determining a path for the drone 202, the system or part of the system, e.g. the drone 202 and/or the control unit 110 shown in FIGS. 1A-1C, might take the field of view of each of the drone 202's cameras into account, or may favor one camera over the other depending on the goal(s) of the drone 202.

Figure 3A:
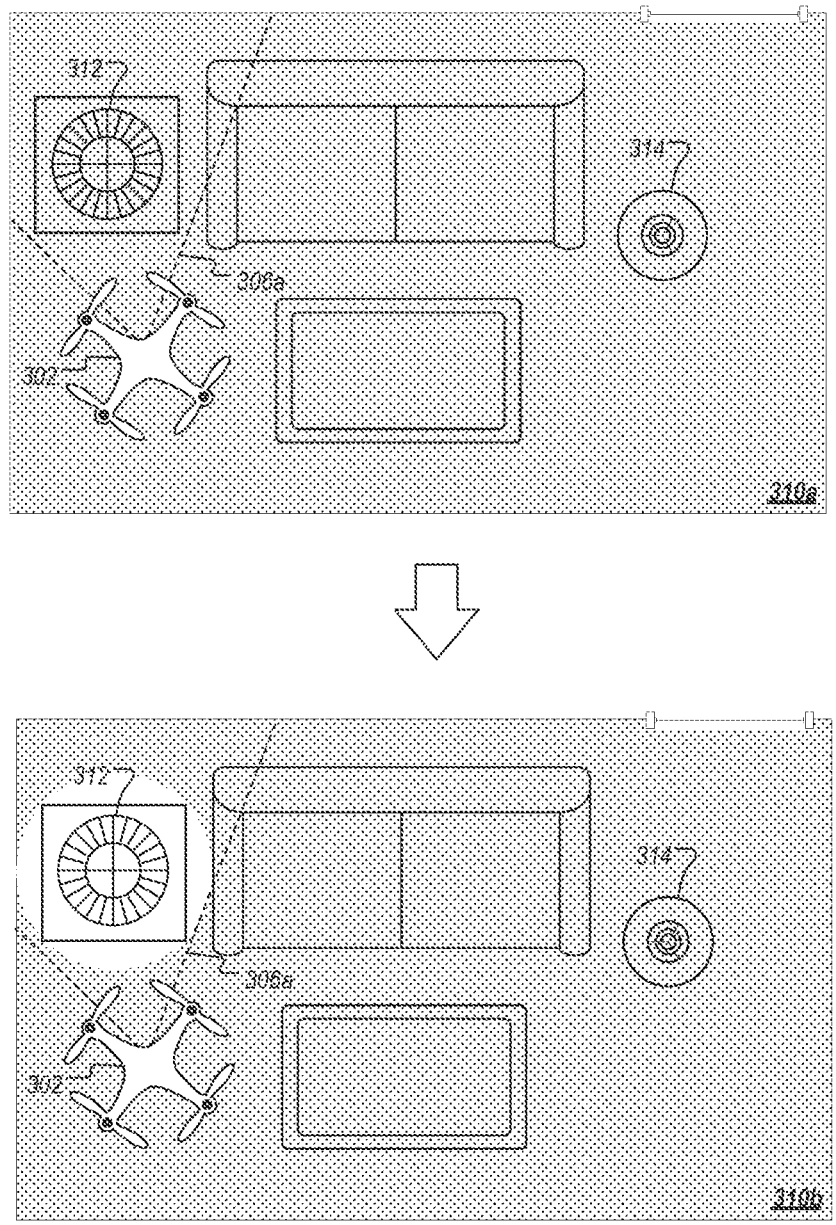
FIGS. 3A-3B are diagrams showing an example process for building or updating a map of an environment.
Figure 3B:
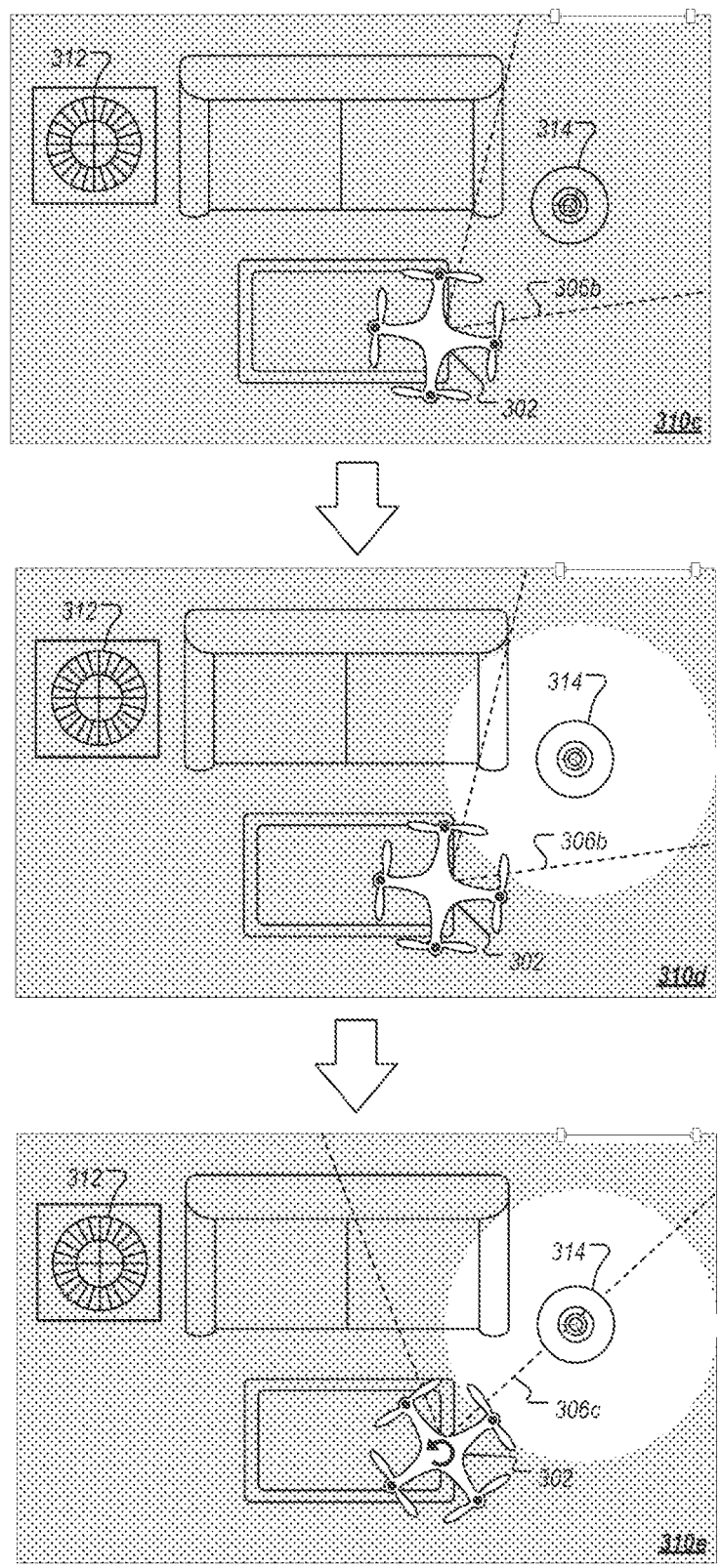

FIGS. 3A-3B are diagrams showing an example process for building or updating a map of an environment, e.g. an environment map. As shown in FIGS. 3A-3B, a drone 302 is using an onboard camera to collect data on the lighting elements of a room 310 that can be used in generating or updating an environment map.

As discussed above, an environment map may include not only the physical objects present within an environment but also the lighting elements of the environment. The lighting elements included in the environment map may include various light source, e.g. an area that has a detected brightness or luminosity that is determined to be sufficiently bright or luminous, and their locations within the environment. A light source may be a direct light source, e.g., a lamp, the sun, overhead lighting, etc., or as an indirect light source. An indirect light source may be any surface of a feature within the environment that reflects a sufficient amount/intensity of light from a direct light source.

Figure 6:
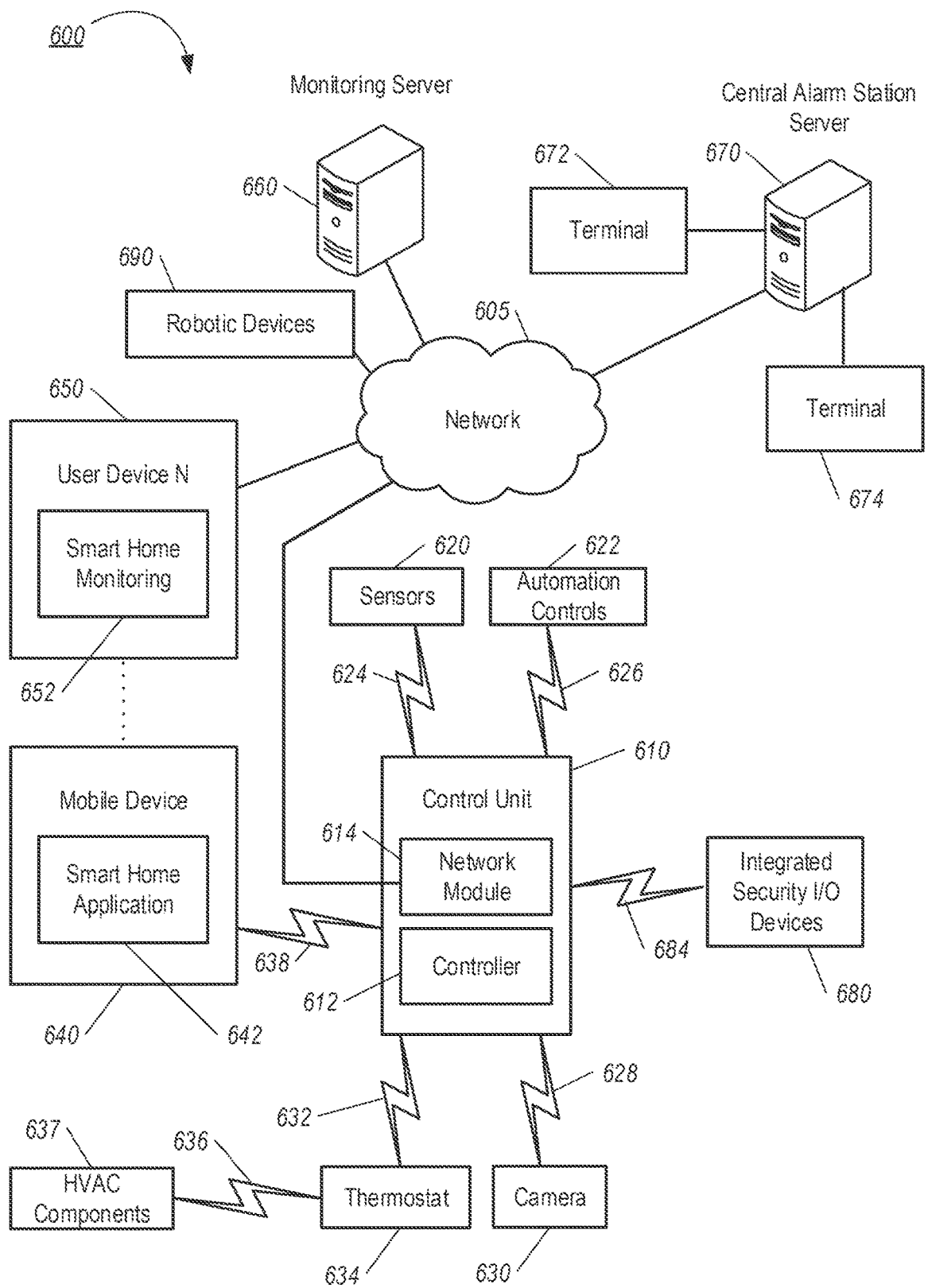
FIG. 6 is a block diagram illustrating an example security monitoring system.

In some implementations, the system, e.g. the system 100 shown in FIGS. 1A-1C or the monitoring system 600 shown in FIG. 6, or part of the system may use data not directly obtained from the drone 302 to generate or modify an environment map. Some of this data might be available at installation time of the system based on blueprints of the environment, installer notes, or the configuration and calibration of other elements of the home security and automation system, cameras or lighting equipment of the system 100. For example, the system or part of the system may use a blueprint of the environment, e.g. the monitored property 120 shown in FIGS. 1A-1C, to identify the locations of the walls of the environment for inclusion in an environment map.

In determining if the detected brightness or luminosity of a light source meets a threshold level of brightness or luminosity, the drone 302 and/or the control unit 110 shown in FIGS. 1A-1C may need to direct the onboard camera to step through multiple exposure settings. For example, a light source may cause areas of an image taken from the onboard camera to clip or be overexposed. Accordingly, to more accurately estimate the brightness or the luminosity of the light source while avoiding clipping or overexposure, the drone 302 may instruct its onboard camera to step through multiple exposure settings. This process of stepping through multiple exposure settings may include, for example, obtaining a first image from the onboard camera, analyzing the image, e.g. by the drone 302 or by the control unit 110, determining that clipping or overexposure is present, adjusting the exposure settings of the onboard camera, obtaining a second image from the onboard camera, analyzing the second image, etc. Adjusting of the exposure settings of the onboard camera may include adjusting the aperture of the onboard camera, adjusting a shutter speed of the onboard camera, and/or adjusting the onboard camera's ISO sensitivity. If the drone 302 and/or the control unit 110 determines that an image of the light source contains no clipping or overexposure, the drone 302 and/or the control unit 110 may save an indication of the onboard camera's exposure settings used when capturing the image. The drone 302 and/or the control unit 110 may incorporate these exposure settings into one or more environment maps and associate them with the particular light source.

In differentiating between a direct light source and an indirect light source, the drone 302 and/or the control unit 110 shown in FIGS. 1A-1C may classify a light source based on detected features of the light source. For example, lens flare or blooming may be features of a light source that are only associated with a direct light source. Accordingly, in this example, if the drone 302 and/or the control unit 110 detects the occurrence of lens flare or blooming in an area of an image that is determined to be a light source, then the drone 302 and/or the control unit 110 may classify the area of the image as a direct light source instead of an indirect light source.

In some implementations, the drone 302 and/or the control unit 110 shown in FIGS. 1A-1C may model the detected features of a light source. For example, the drone 302 and/or the control unit 110 may determine how the detected features of a light source change with the onboard camera's exposure settings. In this example, an image taken by the onboard camera may include lens flare or blooming, however a different image of the same scene taken by the onboard camera, e.g. after its exposure settings have been modified one or more times by the drone 302 and/or the control unit 110, may not contain lens flare or blooming. The drone 302 and/or control unit 110 may use this information in order to determine if lens flare or blooming can be expected based on the current exposure settings of the onboard camera. The drone 302 and/or control unit 110 may use this information in order to anticipate how the exposure settings of the onboard camera should be adjusted when the light source comes into the field of view of the camera 104. For example, it may be detrimental for navigation for there to be observable lens flare or blooming because, for example, the drone 302 may start tracking the lens flare or blooming thinking it is a visual feature of the environment, e.g. the room 310 or the monitored property 120 shown FIGS. 1A-1C. Accordingly, the drone 302 and/or control unit 110 may adjust the exposure settings of the onboard camera in anticipation of the lens flare or blooming. The drone 302 and/or control unit 110 may incorporate how the detected features of a light source change with the camera 104's exposure settings into one or more environment maps. For example, the drone 302 and/or control unit 110 may indicate what exposure settings the camera 104 should be using at various points within the environment, e.g. the room 310 or the monitored property 120.

In these implementations, the drone 302 and/or the control unit 110 shown in FIGS. 1A-1C may also or alternatively model the detected features of a light source by determining how the appearance of these features changes with pose, e.g. the onboard camera's and/or the drone 302's position and orientation with respect to the light source. For example, the drone 302 may make one or more modifications to the pose of the onboard camera, e.g. by changing its own position and/or orientation, with respect to the light source and obtain images of the light source with the onboard camera in the different poses. The drone 302 and/or the control unit 110 may analyze these images to determine what poses, if any, result in, for example, lens flare or blooming from the light source not being visible. The drone 302 and/or the control unit 110 may use this information to assist the drone 302 in navigating through the environment, e.g. the room 310 or the monitored property 120 shown FIGS. 1A-1C. For example, the drone 302 and/or the control unit 110 may use this information to plan or modify a path for the drone 302 to use when navigating through the environment. The path chosen may keep the onboard camera in a pose such that lens flare or blooming from the light source is not visible. The drone 302 and/or control unit 110 may incorporate how the detected features of a light source change with the pose of the drone 302 and/or its onboard camera into one or more environment maps. For example, the drone 302 and/or control unit 110 may indicate the position, orientation, and/or angle of the drone 302 and/or its onboard camera that should be used or avoided at various points within the environment.

In FIG. 3A, the drone 302 is recording the visual features and the lighting conditions of the room 310. The drone 302 may be referring to an already existing environment map for the room 310. Alternatively, the drone 302 may be recording the visual features and the lighting conditions of the room 310 for the first time and may not be referring to existing environment map. The room 310 includes a first lamp 312 and a second lamp 314. The lamps 312 and 314 may be included in an existing environment map for the room 310. The lamps 312 and 314 may be included in an existing environment map for the room 310 as visual features, as direct light sources, and/or as indirect lights sources.

The drone 302 may communicate with a system, e.g. the system 100 shown in FIGS. 1A-1C or the monitoring system 600 shown in FIG. 6, or with part of the system, e.g. the control unit 110 shown in FIGS. 1A-1C.

The drone 302 may use the data it collects with its onboard sensors, e.g., camera(s), light sensor(s), ToF sensors, etc., to generate or update an environment map.

The drone 302 may send the data it collects with its onboard sensors, e.g., camera(s), light sensor(s), ToF sensors, etc., to the control unit 110 shown FIGS. 1A-1C. The control unit 110 may use this data to generate or update an environment map.

In some implementations, the drone 302 is the drone 102 shown in FIGS. 1A-1C. In some implementations, the drone 302 is the drone 202 shown in FIGS. 2A-2B.

As shown, the drone 302 approaches the lamp 312 in the room 310a to collect data on the lamp 312. The drone 302 positions itself and/or its onboard camera such that the lamp 312 is within a field of view 306a of its onboard camera. Once the lamp 312 is in the field of view 306a of the onboard camera, the drone 302 may capture one or more images which include the lamp 312. These images may be used by the system or part of the system, e.g. the drone 302 or the control unit 110 shown in FIGS. 1A-1C, to define visual features and geometries for the lamp 312. The drone 302 may also capture other senor data using one or more other onboard sensors. The captured images and/or other sensor data may be used by the drone 302 to determine that the lamp 312 is currently off, e.g. by determining that the lamp 312 is not producing any or a sufficient amount of light, determining that the lamp 312 is not currently a light source, determining that the lamp 312 is not currently a direct light source, etc. Alternatively or additionally, e.g. in seeking a confirmation, the drone 302 may communicate with the system or part of the system, e.g. the control unit 110, to determine that the lamp 312 is off.

The images and/or other data collected from the drone 302's onboard sensors may be used by the system or part of the system, e.g. the drone 302 or the control unit 110 shown in FIGS. 1A-1C, to define lighting elements in the area of the room 310a corresponding with the field of view 306a when the lamp 312 is off and to associate one or more of those lighting elements with the lamp 312. For example, the system or part of the system may use the images and/or other sensor data to determine angles of lighting, diffuse reflections, whether the light is artificial or natural light, direct or indirect light sources, and/or surface textures and specularity of the area of the room 310a that corresponds with the onboard camera's field of view 306a. The system or part of the system may associate these lighting elements with the lamp 312, or with different parts of the lamp 312, when it is off, e.g. by comparing the detected locations of the lighting elements with the location of the lamp 312 or with the locations of different parts of the lamp 312. The system or part of the system may add these associations to an environment map, use these association to update an environment map, e.g. to include the associations or replace previous associations within an environment map, or use these associations in generating an environment map.

After the drone 302 determines that the lamp 312 is off, the drone 302 may send instructions to the system or to part of the system, e.g. the control unit 110 shown in FIGS. 1A-1C, to turn the lamp 312 on. Alternatively, the drone 302 may send these instructions directly to the lamp 312. In response, the system or part of the system, e.g. the control unit 110 or the drone 302, turns on the lamp 312 in the room 310b.

As a result of turning the lamp 312 on, the lighting elements of the room 310b are changed. As shown, the room 310b now includes a well-lit area surrounding the lamp 312. The lamp 312 serves as a direct light source of artificial light responsible for creating the well-lit area of the room 310b.

As shown, the well-lit area of the room 310b generated by the lamp 312 is within the field of view 306a of the drone 302's onboard camera. Accordingly, the drone 302 may not need to adjust its pose or its onboard camera's pose to capture the new lighting elements of the room 310b. For example, the drone 302 may determine using its onboard camera or other sensors to determine the location of the well-lit area generated by the lamp 312 being on. The drone 302 may determine this location using its onboard camera or other sensors by identifying transition zones of lighting.

The drone 302 may capture one or more images which include the lamp 312 while it is on. These images may be used by the system or part of the system, e.g. the drone 302 or the control unit 110 shown in FIGS. 1A-1C, to further define visual features and geometries for the lamp 312. The drone 302 may also capture other senor data using one or more other onboard sensors. The captured images and/or other sensor data may be used by the system or part of the system, e.g. the drone 302 or the control unit 110, to define lighting elements in the area of the room 310b corresponding with the field of view 306a when the lamp 312 is on and to associate one or more of those lighting elements with the lamp 312. For example, the system or part of the system may use the images and/or other sensor data to determine angles of lighting, diffuse reflections, whether the light is artificial or natural light, direct or indirect light sources, and/or surface textures and specularity of the area of the room 310b that corresponds with the onboard camera's field of view 306a. The system or part of the system may associate these lighting elements with the lamp 312, or with different parts of the lamp 312, when it is on, e.g. by comparing the detected locations of the lighting elements with the location of the lamp 312 or with the locations of different parts of the lamp 312. The system or part of the system may add these associations to an environment map, use these association to update an environment map, e.g. to include the associations or replace previous associations within an environment map, or use these associations in generating an environment map.

In FIG. 3B, the drone 302 is recording the visual features and the lighting conditions of the room 310. The drone 302 may be referring to an already existing environment map for the room 310. Alternatively, the drone 302 may be recording the visual features and the lighting conditions of the room 310 for the first time and may not be referring to existing environment map. The room 310 includes a first lamp 312 and a second lamp 314. The lamps 312 and 314 may be included in an existing environment map for the room 310. The lamps 312 and 314 may be included in an existing environment map for the room 310 as visual features, as direct light sources, and/or as indirect light sources.

As shown, the drone 302 approaches the lamp 314 in the room 310c to collect data on the lamp 314. The drone 302 positions itself and/or its onboard camera such that the lamp 314 is within a field of view 306b of its onboard camera. Once the lamp 314 is in the field of view 306b of the onboard camera, the drone 302 may capture one or more images which include the lamp 314. These images may be used by the system or part of the system, e.g. the drone 302 or the control unit 110 shown in FIGS. 1A-1C, to define visual features and geometries for the lamp 314. The drone 302 may also capture other senor data using one or more other onboard sensors. The captured images and/or other sensor data may be used by the drone 302 to determine that the lamp 314 is currently off, e.g. by determining that the lamp 312 is not producing any or a sufficient amount of light, determining that the lamp 312 is not currently a light source, determining that the lamp 312 is not currently a direct light source, etc. Alternatively or additionally, e.g. in seeking a confirmation, the drone 302 may communicate with the system or part of the system, e.g. the control unit 110, to determine that the lamp 314 is off.

The images and/or other data collected from the drone 302's onboard sensors may be used by the system or part of the system, e.g. the drone 302 or the control unit 110 shown in FIGS. 1A-1C, to define lighting elements in the area of the room 310c corresponding with the field of view 306b when the lamp 314 is off and to associate one or more of those lighting elements with the lamp 314. For example, the system or part of the system may use the images and/or other sensor data to determine angles of lighting, diffuse reflections, whether the light is artificial or natural light, direct or indirect light sources, and/or surface textures and specularity of the area of the room 310c that corresponds with the onboard camera's field of view 306b. The system or part of the system may associate these lighting elements with the lamp 314, or with different parts of the lamp 314, when it is off, e.g. by comparing the detected locations of the lighting elements with the location of the lamp 314 or with the locations of different parts of the lamp 314. The system or part of the system may add these associations to an environment map, use these association to update an environment map, e.g. to include the associations or replace previous associations within an environment map, or use these associations in generating an environment map.

After the drone 302 determines that the lamp 314 is off, the drone 302 may send instructions to the system or to part of the system, e.g. the control unit 110 shown in FIGS. 1A-1C, to turn the lamp 314 on. Alternatively, the drone 302 may send these instructions directly to the lamp 314. In response, the system or part of the system, e.g. the control unit 110 or the drone 302, turns on the lamp 314 in the room 310d.

As a result of turning the lamp 314 on, the lighting elements of the room 310d are changed. As shown, the room 310d now includes a well-lit area surrounding the lamp 314. The lamp 314 serves as a direct light source of artificial light responsible for creating the well-lit area of the room 310d.

The drone 302 may capture one or more images which include the lamp 314 while it is on. These images may be used by the system or part of the system, e.g. the drone 302 or the control unit 110 shown in FIGS. 1A-1C, to further define visual features and geometries for the lamp 314. The drone 302 may also capture other sensor data using one or more other onboard sensors. The captured images and/or other sensor data may be used by the system or part of the system, e.g. the drone 302 or the control unit 110, to define lighting elements in the area of the room 310d corresponding with the field of view 306b when the lamp 314 is on and to associate one or more of those lighting elements with the lamp 314. For example, the system or part of the system may use the images and/or other sensor data to determine angles of lighting, diffuse reflections, whether the light is artificial or natural light, direct or indirect light sources, and/or surface textures and specularity of the area of the room 310d that corresponds with the onboard camera's field of view 306b. The system or part of the system may associate these lighting elements with the lamp 314, or with different parts of the lamp 314, when it is on, e.g. by comparing the detected locations of the lighting elements with the location of the lamp 314 or with the locations of different parts of the lamp 314. The system or part of the system may add these associations to an environment map, use these association to update an environment map, e.g. to include the associations or replace previous associations within an environment map, or use these associations in generating an environment map.

As shown, the well-lit area of the room 310d generated by the lamp 314 is not within the field of view 306b of the drone 302's onboard camera. Accordingly, the drone 302 may need to adjust its pose or its onboard camera's pose to fully capture the new lighting elements of the room 310d. For example, the drone 302 may determine using its onboard camera or other sensors that the location of the well-lit area extends beyond the field of view 306b. The drone 302 may make this determination after, for example, failing to identify the transition zones of lighting generated by the lamp 314, e.g. by failing to detect the edges of the well-lit area.

After determining that the well-lit area of the room 310d generated by the lamp 314 is not within the field of view 306b of the drone 302's onboard camera, the drone 302 may changes its pose or the pose of its onboard camera. The drone 302 may change its pose or the pose of its onboard camera until, for example, it detects an end or an edge of the well-lit area. For example, as shown in room 310e, the drone 302 has rotated itself in a counter-clockwise direction until it detects that the end or edge of the well-lit area generated by the lamp 314 is within is onboard camera's field of view 306c. The drone 302 may detect the end or an edge of the well-lit area by, for example, detecting one or more transition zones.

Once the drone 302 has detected the end or edge of the well-lit area generated by the lamp 314, the drone 302 may capture one or more additional images or additional sensor data. These images may be used by the system or part of the system, e.g. the drone 302 or the control unit 110 shown in FIGS. 1A-1C, to further define visual features and geometries for the lamp 314. The captured images and/or other sensor data may be used by the system or part of the system, e.g. the drone 302 or the control unit 110, to further define lighting elements in the area of the room 310e corresponding with the field of view 306c when the lamp 314 is on and to associate one or more of those lighting elements with the lamp 314.

In some implementations, the drone 302 may record observations about lighting elements, e.g. lighting sources, through direct measurement of illumination using onboard light sensors at various points in the environment, e.g. the room 310. These direct measurement observations can provide accurate readings of the amount of light reaching the current position of the drone 302 from various angles. The drone 302 may move to various poses in the environment, e.g. the room 310, in order to collect additional light readings, triangulate a source, determine shaded areas, etc.

In some implementations, the drone 302 may record observations about lighting elements, e.g. lighting sources, through direct observation with its onboard camera(s). The brightest areas of the camera's field of view can be recorded as direct or indirect light sources. Some light sources may cause areas of the image to clip or over saturate—at various points in the observation, the drone 302 may step through multiple exposure settings in order to more accurately estimate the brightness of the source without clipping. The system or part of the system, e.g. the drone 302 or the control unit 110 as shown in FIGS. 1A-1C, might also recognize artifacts from direct light sources, such as lens flare or blooming and seek to characterize these or model how they change with respect to exposure or pose. The drone 302 may move to various poses in the environment, e.g. the room 310, in order to collect additional light readings, triangulate a source, determine shaded areas, etc. The drone 302 may move or adjust the pose of its onboard camera in order to collect additional light readings, triangulate a source, determine shaded areas, etc.

In some implementations, the drone 302 may record observations about lighting elements, e.g. lighting sources, through indirect observation with its onboard camera(s) by observing the relative brightness of other surfaces in the environment, e.g. the room 310, and mapping how they change with lighting changes or with drone 302's pose or position, the system can measure and record in the environment map the reflectivity of those surfaces and their relation to the lighting sources. The system or part of the system, e.g. the drone 302 or the control unit 110 as shown in FIGS. 1A-1C, may infer the position and strength of sources which it cannot directly observe due to occlusion from navigable areas. In some situations, the system or part of the system, e.g. the drone 302 or the control unit 110, may treat very reflective surfaces as direct lighting sources.

In some implementations, the drone 302 measures surface reflectivity using other sensors onboard such as a ToF sensor. The ToF sensor has an illuminator with known power and can be used by the drone 302 to measure the distance of the surfaces and the amount of light reflected by those surfaces. From that, the system or part of the system, e.g. the drone 302 or the control unit 110 as shown in FIGS. 1A-1C, can estimate the reflectivity of the surfaces. The system or part of the system may include an indication of the reflectivity of the surfaces as part of the environment map.

In some implementations, during the course of multiple observations over time, the system or part of the system, e.g. the drone 302 or the control unit 110 as shown in FIGS. 1A-1C, may learn useful information about how lighting sources change in an environment, e.g. the room 310, and how those changes affect the visible features within the environment.

For example, some light sources, such as windows, may be time of day, time of year, or weather dependent, and thus certain parameters can be estimated by the system or part of the system, e.g. the drone 302 or the control unit 110 as shown in FIGS. 1A-1C, using time and/or weather data.

As another example, some light sources will vary based on the state of a security and automation system, e.g. the system 100 shown in FIGS. 1A-1C or the monitoring system 600 shown in FIG. 6. For example, if the security and automation system state is armed, the system may automatically close the blinds and/or turn off the lights within an environment, e.g. the room 310. In this example, the drone 302 may learn that the current system state is armed and estimate the lighting conditions of the environment based on the armed state.

In these implementations, the system or part of the system, e.g. the drone 302 or the control unit 110 as shown in FIGS. 1A-1C, may maintain a mapping between the active mix of light sources within an environment, e.g. the room 310, and the detection of various visual features in the environment from given poses or viewing angles of the drone 302.

In some implementations, and as discussed above, the drone 302 may incorporate its own lighting or be able to control lighting in the room 310 based on integration with the security and automation system, e.g. the system 100 shown in FIGS. 1A-1C or the monitoring system 600 shown in FIG. 6. The drone 302 may intentionally alter the lighting settings in order to measure the effect on the environment, e.g. the room 310, or on the light striking its sensors.

In these implementations, the drone 302 may vary its onboard lighting and measuring the resulting light changes using its onboard camera(s) or onboard light sensors. These changes may indicate a reflectivity of the surface that the onboard camera(s) or onboard light sensors are directed at. The system or part of the system, e.g. the drone 302 or the control unit 110 as shown in FIGS. 1A-1C, can then modify an environment map so that it includes an indication of the reflectivity of those one or more surfaces.

In these implementations, and as discussed above, the drone 302 may vary other lighting, e.g. the lamps 312 and 314, in the environment, e.g. the room 310, and measure the resulting light changes. By varying the lighting within the environment, the system or part of the system, e.g. the drone 302 or the control unit 110 as shown in FIGS. 1A-1C, can learn the extent to which those light sources effect the environment.

In these implementations, the drone 302 may increase or decrease lighting in a given area of an environment, e.g. the room 310, or change the directionality of lighting to that area in order to build a more robust set of features that can be later used for localization in that area of the environment. The system or part of the system, e.g. the drone 302 or the control unit 110 as shown in FIGS. 1A-1C, can then modify an environment map so that it includes the more robust set of features for the environment.

In some implementations, a hand held device such as a mobile phone or other proxy for the robot might be used to survey the lighting sources in the environment, e.g. the room 310, pre-installation.

In some implementations, the system or part of the system, e.g. the drone 302 or the control unit 110 as shown in FIGS. 1A-1C, may create and/or modify multiple environment maps for the environment, each of the environment maps corresponding with the different lighting conditions of the environment. For example, the system or part of the system may generate and/or update an environment map for when the lamps 312 and 314 are off, an environment map for when the lamp 312 is on and the lamp 314 is off, an environment map when the lamp 314 is on and the lamp 312 is off, and an environment map when the lamps 312 and 314 are on.

In some implementations, the drone 302 can record a four-dimensional (4D) map including illumination at each XYZ location in the environment, e.g. the room 310, during initial setup. During mission tracking, the drone 302's camera settings can be adjusted or on-target lights can be utilized to match illumination of recorded environment maps, e.g. the drone 302 can focus on feature rich areas of the environment known from previous flights, which should result in more accurate feature recognition.

After knowing where potential light sources are and how strong they are based on past flights at similar times, the drone 302 may roughly predict and/or simulate the shadow of certain visual features. For example, the drone 302 may be able to predict and/or simulate the shadows generated by larger features within an environment, such as large objects or walls, given the current lighting conditions. The shade outline, e.g. the transition zone, as a result of the shadow can be used by the drone 302 short term but should be ignored for long term measurements and recordings.

Figure 4:
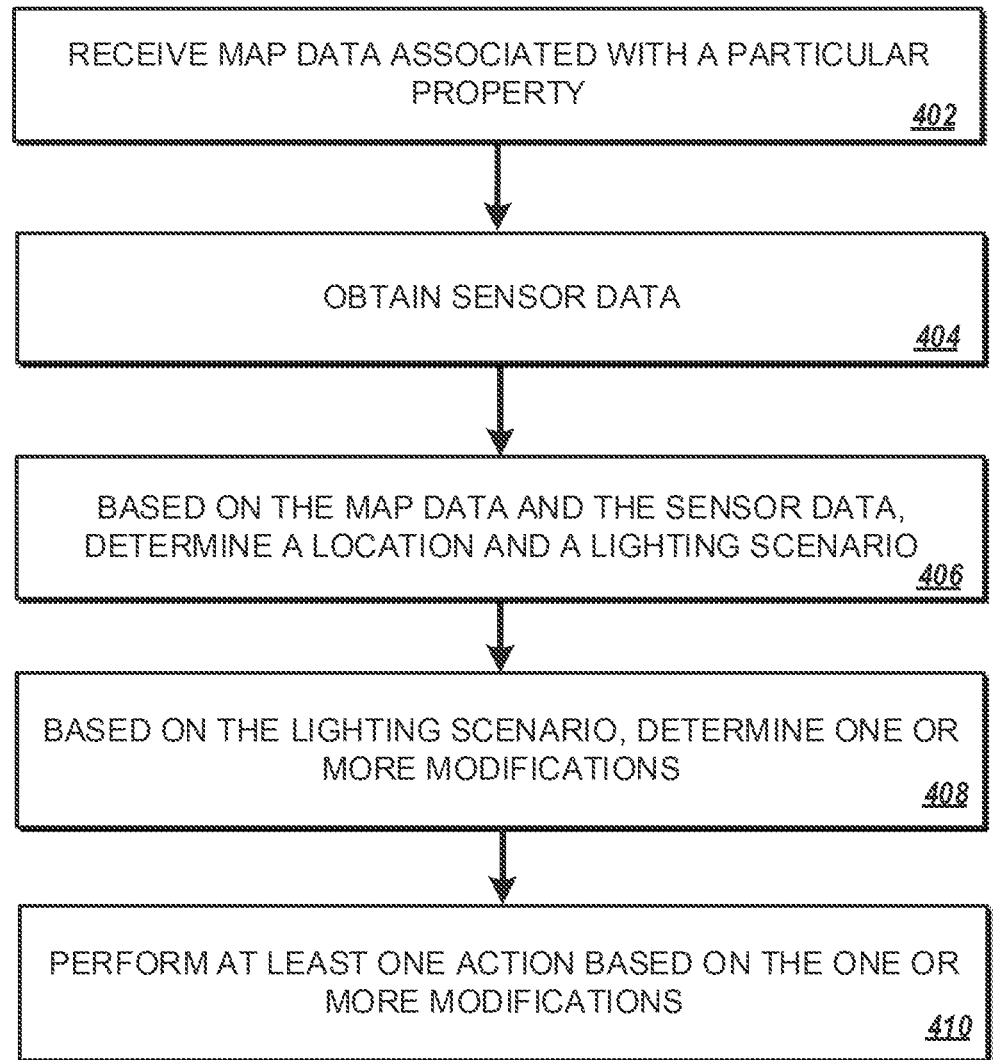
FIG. 4 is a flow diagram illustrating an example of a process for lighting adaptive navigation.

FIG. 4 is a flowchart of an example process 400 for lighting adaptive navigation. The process 400 can be performed, at least in part, using the system 100 described in FIG. 1 or the monitoring system 600 described in FIG. 6.

The process 400 includes receiving map data associated with a property (402). Receiving map data may include, for example, receiving a map, such as three-dimensional map for navigating through the property, from an external computing system, such as the control unit 110 shown in FIGS. 1A-1C. Alternatively, receiving the map data may include, for example, accessing a map, such as three-dimensional map for navigating through the property, from on-board memory. The map data may be, for example, a three-dimensional map or two-dimensional map. The map data may be, for example, a previously generated environment map that includes indications of the locations and/or types of objects in the property, and/or the locations of light sources (and, optionally, characteristics of the light sources) in the property. Alternatively, the map data may be a floor plan for a property that may or may not include indications of the locations of objects and light sources within the property. As an example, as shown in FIGS. 1A-1C, the drone 102 may receive map data, e.g. an environment map, from the control unit 110.

In some cases, receiving the map data includes receiving map data that indicates multiple light sources of the property, and determining the lighting scenario includes identifying a subset of the multiple light sources that provided light indicated by the sensor data. For example, with respect to FIGS. 1A-1C, the multiple light sources may include the lights 118a-118c, and the sunlight coming through the window 122. The drone 102 may identify the sunlight coming through the window 122 as the subset of the multiple light sources after only detecting that light source, and/or not detecting light from the lights 118A-118C. The map data may also include metadata such as labels for the light sources. This metadata may indicate the type of light source (e.g., lamp, ceiling light, sunlight coming through a window, indirect light from a lamp, indirect light from a ceiling light, indirect sunlight coming through a window, etc.), and/or characteristics of the light source when in an on-state (e.g., wavelength, light intensity, oversaturation area for one or more sensors of the drone 102, etc.).

In some cases, identifying a subset of the multiple light sources responsible for the lighting scenario includes determining a current state of one or more light sources of the multiple light sources, and selecting, from among the one or more light sources, the subset of the multiple light sources for being in an on state. As an example, with respect to FIGS. 1A-1C, the drone 102 can use the camera 104 or other sensors to detect the presence of light at the end of the hallway. The drone 102 may refer to the map data and to its collected sensor data to determine that the lights 118A-118C are likely not producing light (e.g., are in an off state), and that the only current source of light is likely sunlight coming through the window 122 (e.g., in an on state). The on state may indicate that light from a corresponding light source is currently visible to a sensor of the robotic device (e.g., the drone 102). The on state may alternatively indicate that the light source is currently producing light. In contrast, the off state may indicate that the light from a corresponding light source is currently not visible to a sensor of the robotic device (e.g., the drone 102). The off state may alternatively indicate that the light source is currently not producing light.

A light source may have one or more states. For example, some light sources may have an on state and an off state. Specifically, a ceiling light may have an off state where it is not producing light, and a single on state. However, a given lamp may have an off state and multiple on states that correspond to different light intensities and/or light wavelengths. As another example with respect to FIGS. 1A-1C, light coming through the window 122 may have an off state when the blinds 112 are closed, and various on states depending on the time of day and/or the calendar date.

The process 400 includes obtaining sensor data (404). For example, as shown in FIGS. 1A-1C, the drone 102 may obtain sensor data from its onboard sensors, such as image data from its camera 104, location data from an onboard GPS unit, data from other optical sensors (e.g., laser rangefinders, 3D lidar, time-of-flight sensor, sonar sensors, etc.), etc. The camera 104 may be a visible light camera, an infrared light camera, a time of flight sensor, etc. As shown in FIGS. 1A-1C, the drone 102 may also obtain sensor data from external sensors, such as image data from the camera 114 and/or the camera 116 of the property 120.

The process 400 includes, based on the map data and the sensor data, determining a lighting scenario (406). For example, as shown in FIGS. 1A-1C, the drone 102 may use the sensor data to detect a transition zone. The drone 102 may compare the location of the transition zone and/or its own location with the map data, e.g. an environment map, to determine a lighting scenario. For example, the drone 102 may compare the location of the transition zone and/or its own location with the map data, e.g. an environment map, to determine that the cause of the transition zone is the sunlight coming through the window 122 as shown in FIG. 1A.

The process 400 includes, based on the lighting scenario, determining one or modifications (408). The one or more modifications may include a modification to the lighting scenario (e.g., to one more light sources causing the lighting scenario), to a planned navigation path for a robotic device (e.g., the drone 102), to settings for a sensor of the robotic device (e.g., exposure settings for the camera 104 of the drone 102), to a position for a sensor of the robotic device (e.g., a position of the camera 104 of the drone 102), or to a position of the robotic device. For example, as shown in FIGS. 1A-1C, the drone 102 may determine that based on the lighting scenario, e.g. based on light coming through the window 122 causing one or more transition zones—which may make feature detection more difficult, that the blinds 112 should be closed/lowered and/or that the lights 118a-118c should be turned on.

In some cases, determining the one or more modifications includes determining a modification to the lighting scenario. For example, with respect to FIGS. 1A-1C, the drone 102 can determine modifications to the lighting scenario by determining different states for various light sources. Specifically, the drone 102 can determine that the blinds 112 should be lowered to effectively remove the sunlight coming through the window 122, and that the lights 118A-118C should be turned on which would provide, for example, a more controlled lighting scenario that allows for more accurate visual navigation.

In some cases, determining the modification to the lighting scenario includes determining that a state of at least one light source of the property should be changed to increase light or decrease light. For example, the drone 102 may determine that the states of the lights 118A-118C should be changed—to have them turned on—to increase light.

In some cases, determining the modification includes determining a modification to the planned navigation path based on the lighting scenario. For example, the modification to the planned navigation path based on the lighting scenario may include determining a navigation path that avoids one or more light transition areas in the property. As an example, with respect to FIGS. 2A-2B, the drone 202 may determine modify (e.g. replace) the path 220 with the paths 222 and 224 in order to avoid the light transition zone generated by light coming through the window 212.

The process 400 includes performing at least one action based on the one or more modifications (410). For example, as shown in FIGS. 1A-1C, the drone 102 may send instructions 134 to the control unit 110 to close the blinds 112 and/or to turn on the lights 118a-118c.

In some cases, the process 400 optionally includes initiating navigation of at least a portion of the property using the robotic device, detecting, from the sensor data or the map data, a light transition area, and, in response to detecting the light transition area, suspending the navigation. The light transition area (e.g., light transition zone) may include a dimly-lit portion and a well-lit portion. For example, with respect to FIG. 1A, the drone 102 detects the transition zone using its camera 104 as there is a quick transition from a dimly-lit area to a well-lit area, directly adjacent the dimly-lit area.

As an example, with respect to FIGS. 1A-1C, the drone 102 can begin to navigate the property 120 (e.g., in response to receiving instructions from the control unit 110). The drone 102 can collect sensor data using its camera 104. From this sensor data, the drone 102 can detect the transition zone, e.g., where a dimly-lit area quickly transitions to well-lit area, in the field of view 106 of the camera 104. Additionally or alternatively, the drone 102 can use the map data for the property 120 to determine lighting scenarios, including particular light transitions, that it is likely to encounter. For example, a three-dimensional map may indicate that there is a light transition at the end of the hallway. In response to detecting the light transition, the drone 102 may suspend its navigation to, for example, perform the at least one action.

Determining the lighting scenario may be in response to detecting the light transition area. For example, with respect to FIGS. 1A-1C, in response to detecting the light transition at the end of the hallway, the drone 102 may request from the control unit 110 information as to the state of various light sources in the property 120. For example, the drone 102 may receive from the control unit 110 an indication that the lights 118a-118c are off, and an indication that the blinds 112 are up (e.g., that the light source of sunlight coming through the window 122 is in an on state). In some cases, the drone 102 can request this information directly from the light sources and/or other devices (e.g., the blinds 112).

In some cases, performing the at least one action includes adjusting exposure settings of a camera of the robotic device based on the lighting scenario. For example, with respect to FIGS. 1A-1C, the drone 102 adjust the aperture of the camera 104, a shutter speed or integration time of the camera 104, and/or the camera 104's ISO sensitivity to account for the detected lighting scenario (e.g., the various light sources of the property 120 that the drone 102 can currently detect) or light transition.

In some cases, performing the at least one action includes adjusting a position of a camera of the robotic device to aim the camera away from the well-lit portion or the dimly-lit portion of the light transition area. For example, the well-lit portion of the light transition area may appear overexposed to the camera 104 of the drone 102, making visual-based navigation more difficult. The drone 102 may, in response, rotate the camera 104 away from the well-lit portion of the light transition area before navigating through the light transition area. Similarly, a dimly-lit portion of the light transition area may appear underexposed to the camera 104 of the drone 102, making visual-based navigation more difficult. The drone 102 may, in response, rotate the camera 104 away from the dimly-lit portion of the light transition area before navigating through the light transition area.

In some cases, performing the at least one action includes adjusting a position of the robotic device to aim a camera of the robotic device away from the well-lit portion or the dimly-lit portion of the light transition area. For example, the well-lit portion of the light transition area may appear overexposed to the camera 104 of the drone 102, making visual-based navigation more difficult. The drone 102 may, in response, rotate or otherwise change its position so as to keep the camera 104 aimed away from the well-lit portion of the light transition area before navigating through the light transition area. Similarly, a dimly-lit portion of the light transition area may appear underexposed to the camera 104 of the drone 102, making visual-based navigation more difficult. The drone 102 may, in response, rotate or otherwise change its position so as to keep the camera 104 away from the dimly-lit portion of the light transition area before navigating through the light transition area.

In some cases, performing the at least one action includes transmitting instructions to adjust the lighting scenario by changing a state of one or more light sources and waiting for the lighting scenario to be adjusted. For example, with respect to FIGS. 1A-1C, the drone 102 may send the lighting instructions 134 to the control unit in response to detecting the light transition. The instructions 134 may provide that the blinds 112 be lowered and that the lights 118a-118c be turned on. The drone 102 may wait to resume navigation until it receives confirmation from the control unit 110 that the requested actions have been performed, or until it detects using the camera 104 or one or more other sensors that the lighting scenario has changed to an expected scenario based on the instructions.

In some cases, performing the at least one action includes requesting and receiving a different version of the map data that corresponds to the well-lit portion or the dimly-lit portion of the light transition area. For example, with respect to FIGS. 1A-1C, the drone 102 may request a map that is for the specific lighting scenario that it has detected. For example, the drone 102 may determine using sensor data that the current lighting scenario is that the lights 118a-118c are off and that the blinds 112 are in an up position. As such, the drone 102 may request, e.g., from the control unit 110, a map that is specific for this lighting scenario. Alternatively, the drone 102 may access a map from its internal memory for this lighting scenario. The drone 102 may wait until it has received and/or loaded the new map before resuming navigation.

In some cases, performing the at least one action includes replacing the planned navigation path with a modified navigation path. For example, with respect to FIG. 2B, the drone 202 may replace the direct path 220 (e.g., planned navigation path) with the navigation paths 222 and 224 in response to avoid the light transition caused by sunlight coming through the window 212.

In some cases, the robotic device determines modifications prior to reaching the light transition. This can reduce and/or eliminate the amount of time that the robotic device must suspend its navigation for. For example, with respect to FIGS. 1A-1C, the drone 102 may use the map data to anticipate the light transition at the end of the hallway prior to reaching the end of the hallway. In response, the drone 102 may determine one or more modifications to make to the position of the camera 104, to its own position or pose, to its planned navigation path, to the settings of the camera 104 (e.g., exposure settings), etc., prior to reaching the end of the hallway.

In some cases, the robotic device performs one or more of the at least one action prior to reaching the light transition. This can reduce and/or eliminate the amount of time that the robotic device must suspend its navigation for. As an example, with respect to FIGS. 1A-1C, the drone 102 can take one or more actions, such as changing the position of the camera 104, changing its own position or pose, changing its planned navigation path, changing the settings of the camera 104 (e.g., exposure settings), etc., prior to reaching the end of the hallway.

In some cases, performing the at least one action includes performing an action based on the determined modification to the lighting scenario. For example, performing an action based on the determined modification may include sending instructions to change the state of the at least one light source. For example, with respect to FIGS. 1A-1C, the drone 102 can send the instructions 134 to the control unit 110 in response to determining the blinds 112 should be lowered and that the lights 118A-118C should be turned on.

In some cases, performing the action includes navigating the robotic device along a modified navigation path. For example, with respect to FIGS. 2A-2B, where the drone 202 has determined a modification to the path 220 to instead take the paths 222 and 224, the drone 202 may proceed to navigate down the path 222 prior to navigating down the path 224.

Figure 5:
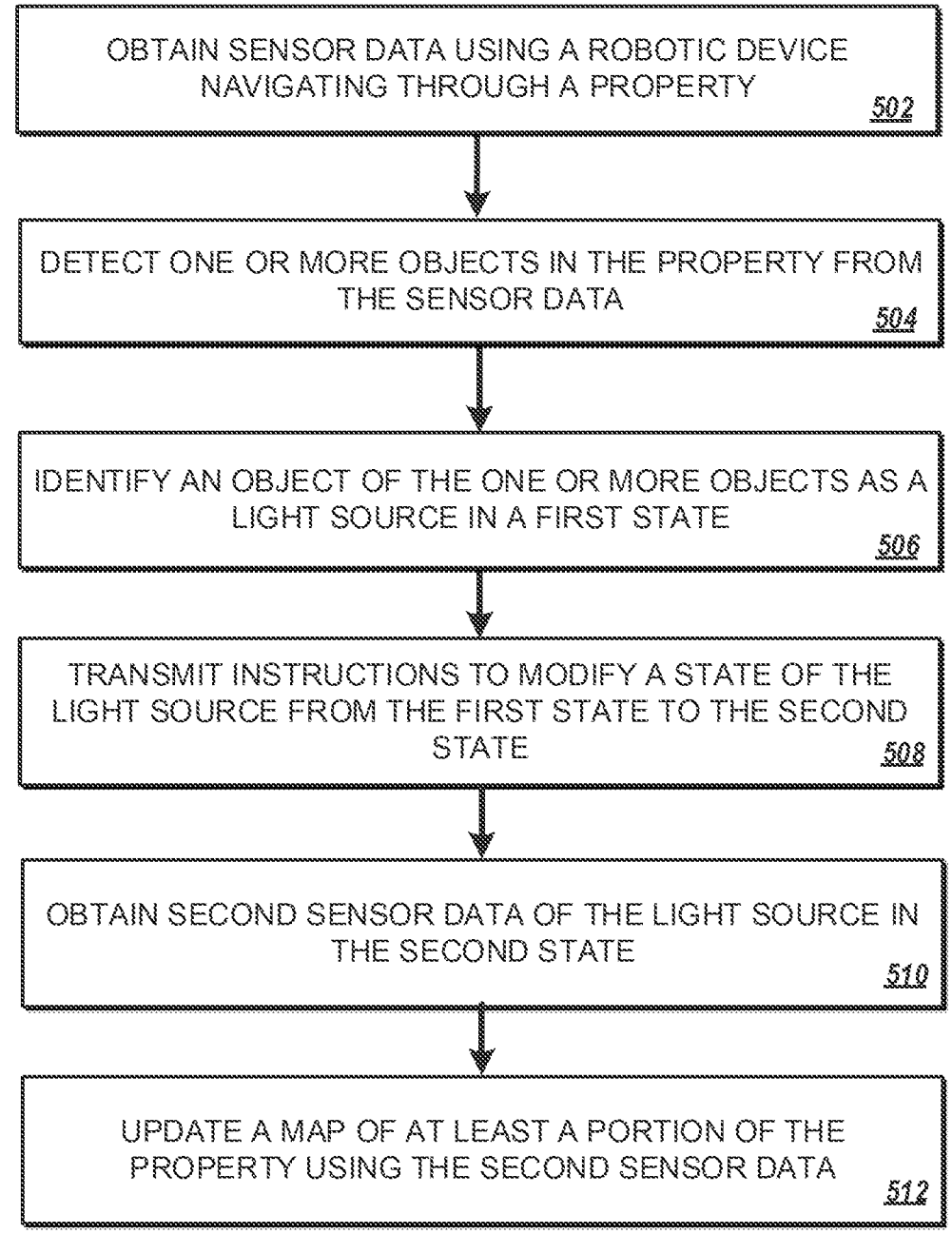
FIG. 5 is a flow diagram illustrating an example of a process for building or updating a map of an environment.

FIG. 5 is a flowchart of an example process 500 for building or updating a map of an environment. The process 500 can be performed, at least in part, using the system 100 described in FIG. 1 or the monitoring system 600 described in FIG. 6.

The process 500 includes obtaining sensor data using a robotic device navigating through a property (502). For example, with respect to FIGS. 3A-3B, the drone 302 may obtain image data for the room 310a using an onboard camera.

The process 500 includes detecting one or more objects in the property from the sensor data (504). For example, with respect to FIGS. 3A-3B, the drone 302 may detect a table, a couch, the lamp 312, and the lamp 314 in the room 310 using the image data it collected using its onboard camera.

The process 500 includes identifying an object of the one or more objects as a light source in a first state (506). For example, with respect to FIGS. 3A-3B, the drone 302 may identify the lamp 312 as a light source. Specifically, the drone 302 may use object recognition to determine that the lamp 312 is a type of lamp. Additionally or alternatively, the drone 302 may refer to a map that indicates that an object at the lamp 312's location is a lamp. As shown in the room 310a, the lamp 312 is in an off state.

The process 500 includes transmitting instructions to modify a state of the light source from the first state to the second state (508). For example, with respect to FIGS. 3A-3B, the drone 302 may send instructions to the lamp 312 (or to the control unit 110) to turn on the lamp 312. As shown in the room 310b, the lamp 312 is now in an on state.

The process 500 includes obtaining second sensor data of the light source in the second state (510). For example, the drone 302 may proceed to collect additional image data using its onboard camera. The drone 302 may take image data of the lamp 312 so as to capture information of the lamp 312 and an area of sufficiently intensity light produced by the lamp 312 (e.g., an overexposed light area; a light area that is detected to meet a threshold intensity, etc.).

In some cases, the drone 302 may analyze the second sensor data to extract information from the second sensor data. For example, the drone 302 may analyze the second sensor data to extract information directly attributable to the lamp 312 in the on state, and to the surfaces of the room 310 that are illuminated by the lamp 312 in the on state. Accordingly, the drone 302 can obtain additional data on the appearance of the lamp 312 when in on state, and how the light produced by the lamp 312 indirectly affects the appearances of other surfaces in the room 310. The drone 302 may only analyze those surfaces that are sufficiently close to the lamp 312 so as to be illuminated by sufficiently intense light produced by the lamp 312.

The process 500 includes updating a map of at least a portion of the property using the second sensor data (512). For example, with respect to FIGS. 3A-3B, the drone 302 can update or can send instructions to update (e.g., to the control unit 110) a map for the room 310 using image data taken after the lamp 312 has been turned on. The map can be updated, for example, to include a representation of the lamp 312 when turned on, and/or to update the representations of surfaces that are illuminated by the lamp 312 when it is turned on. Updating the map may include generating a new version of the map. For example, updating the map with the second sensor data may be limited to the lighting scenario when the lamp 312 is turned on, or when the lamp 312 is turned on and the lamp 314 is turned off.

The process 500 optionally includes generating the map of the at least portion of the property using the sensor data. For example, with respect to FIGS. 3A-3B, the drone 302 may use sensor data, such as image data or lidar data, to generate a three dimensional map of the room 310. The drone 302 may perform object recognition using the sensor data or the map to identify the one or more objects. The drone 302 may use the locations of the one or more objects as provided in the map to reposition itself or its sensors. For example, if the drone 302 uses object recognition to determine that the lamp 312 is a lamp and, therefore, a light source, the drone 302 may use the map to determine how it should change its pose (e.g., rotate) so that the lamp 312 is in the field of view 306a of the drone 302's onboard camera.

Alternatively, the process 500 optionally includes accessing a previously generated map of the at least portion of the property. For example, with respect to FIGS. 3A-3B, the drone 302 may receive an initial map for the room 310 from the control unit 110. The drone 302 may use the sensor data to update the map. The drone 302 may also use the map to identify the locations of light sources such as the lamps 312 and 314.

The process 500 optionally includes receiving a map of at least a portion of the property. Detecting the one or more objects in the property may include identifying, from the map, locations of the one or more objects, and using the sensor data to verify the locations of the one or more objects. For example, with respect to FIGS. 3A-3B, the drone 302 may receive an initial map for the room 310 from the control unit 110. The drone 302 may proceed to use the map to identify the locations of light sources such as the lamps 312 and 314. However, the drone 302 may use the sensor data to verify the locations of the lamps 312 and/or 314, or to update the locations of the lamps 312 and/or 314.

The process 500 optionally includes positioning the robotic device or a camera of the robotic device to place the light source in a field of view of the camera. For example, with respect to FIGS. 3A-3B, the drone 302 may place the lamp 312 or the sufficiently intense light area produced by the lamp 312 in the field of view 306a of the drone 302's onboard camera. The drone 302 may achieve this by modifying at least one of a vertical position of the drone 302, a horizontal position of the drone 302, a pose of the drone 302, and/or a position of the onboard camera so that the lamp 312 and its sufficiently intense light area are in a field of view of the onboard camera.

The process 500 optionally includes, after transmitting instructions to modify the state of the light source from the first state to a second state, determining that a portion of a sufficiently intense light area is not visible in a field of view of a camera of the robotic device; in response to determining that the portion of the sufficiently intense light area is not visible in the field of view of the camera of the robotic device, rotating the robotic device or the camera of the robotic device in a first direction until a first edge of the sufficiently intense light area is detected; and in response to detecting the first edge of the sufficiently intense light area, rotating the robotic device or the camera of the robotic device in a second direction until a second edge of the sufficiently intense light area is detected.

For example, with respect to FIG. 3B, the drone 302 in the room 310d may determine that at least a portion of the sufficiently intense light area produced by the lamp 314 is not visible in the field of view 306b of the drone 302's onboard camera. The drone 302 may determine this by, for example, determining that it does not detect an edge of the sufficiently intense light area of the lamp 314. In response, the drone 302 may rotate counter-clockwise until it detects an edge (e.g., where the light intensity produced by the lamp 314 falls below a threshold intensity). In response to detecting the first edge, the drone 302 may proceed to rotate clockwise until it detects a second edge of the sufficiently intense light area.

In some cases, obtaining second sensor data of the light source in the second state includes obtaining sensor data while the robotic device or the camera of the robotic device is rotating in the first direction and is rotating in the second direction. Continuing the earlier example, during the counter-clockwise and the clockwise rotations, the drone 302 may collect the second sensor data such as image data while the lamp 314 is turned on.

FIG. 6 is a diagram illustrating an example of a home monitoring system 600. The monitoring system 600 includes a network 605, a control unit 610, one or more user devices 640 and 650, a monitoring server 660, and a central alarm station server 670. In some examples, the network 605 facilitates communications between the control unit 610, the one or more user devices 640 and 650, the monitoring server 660, and the central alarm station server 670.

The network 605 is configured to enable exchange of electronic communications between devices connected to the network 605. For example, the network 605 may be configured to enable exchange of electronic communications between the control unit 610, the one or more user devices 640 and 650, the monitoring server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The control unit 610 includes a controller 612 and a network module 614. The controller 612 is configured to control a control unit monitoring system (e.g., a control unit system) that includes the control unit 610. In some examples, the controller 612 may include a processor or other control circuitry configured to execute instructions of a program that controls operation of a control unit system. In these examples, the controller 612 may be configured to receive input from sensors, flow meters, or other devices included in the control unit system and control operations of devices included in the household (e.g., speakers, lights, doors, etc.). For example, the controller 612 may be configured to control operation of the network module 614 included in the control unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the control unit 610 to communicate over a local area network and/or the Internet. The network module 614 also may be a voice band modem configured to enable the alarm panel to communicate over the telephone lines of Plain Old Telephone Systems (POTS).

The control unit system that includes the control unit 610 includes one or more sensors. For example, the monitoring system may include multiple sensors 620. The sensors 620 may include a lock sensor, a contact sensor, a motion sensor, or any other type of sensor included in a control unit system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 620 can also include a radio-frequency identification (RFID) sensor that identifies a particular article that includes a pre-assigned RFID tag.

The control unit 610 communicates with the home automation controls 622 and a camera 630 to perform monitoring. The home automation controls 622 are connected to one or more devices that enable automation of actions in the home. For instance, the home automation controls 622 may be connected to one or more lighting systems and may be configured to control operation of the one or more lighting systems. In addition, the home automation controls 622 may be connected to one or more electronic locks at the home and may be configured to control operation of the one or more electronic locks (e.g., control Z-Wave locks using wireless communications in the Z-Wave protocol). Further, the home automation controls 622 may be connected to one or more appliances at the home and may be configured to control operation of the one or more appliances. The home automation controls 622 may include multiple modules that are each specific to the type of device being controlled in an automated manner. The home automation controls 622 may control the one or more devices based on commands received from the control unit 610. For instance, the home automation controls 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building or home monitored by the control unit 610. The camera 630 may be configured to capture single, static images of the area and also video images of the area in which multiple images of the area are captured at a relatively high frequency (e.g., thirty images per second). The camera 630 may be controlled based on commands received from the control unit 610.

The camera 630 may be triggered by several different types of techniques. For instance, a Passive Infra-Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the home automation controls 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the control unit 610. The camera 630 may employ a small solar cell to recharge the battery when light is available. Alternatively, the camera 630 may be powered by the controller 612's power supply if the camera 630 is co-located with the controller 612.

In some implementations, the camera 630 communicates directly with the monitoring server 660 over the Internet. In these implementations, image data captured by the camera 630 does not pass through the control unit 610 and the camera 630 receives commands related to operation from the monitoring server 660.

The system 600 also includes thermostat 634 to perform dynamic environmental control at the home. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a home and/or environmental data at a home, e.g., at various locations indoors and outdoors at the home. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the control unit 610 and can control the environmental (e.g., temperature) settings based on commands received from the control unit 610.

In some implementations, the thermostat 634 is a dynamically programmable thermostat and can be integrated with the control unit 610. For example, the dynamically programmable thermostat 634 can include the control unit 610, e.g., as an internal component to the dynamically programmable thermostat 634. In addition, the control unit 610 can be a gateway device that communicates with the dynamically programmable thermostat 634. In some implementations, the thermostat 634 is controlled via one or more home automation controls 622.

A module 637 is connected to one or more components of an HVAC system associated with a home, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

In some examples, the system 600 further includes one or more robotic devices 690. The robotic devices 690 may be any type of robots that are capable of moving and taking actions that assist in home monitoring. For example, the robotic devices 690 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 690 may be devices that are intended for other purposes and merely associated with the system 600 for use in appropriate circumstances. For instance, a robotic vacuum cleaner device may be associated with the monitoring system 600 as one of the robotic devices 690 and may be controlled to take action responsive to monitoring system events.

In some examples, the robotic devices 690 automatically navigate within a home. In these examples, the robotic devices 690 include sensors and control processors that guide movement of the robotic devices 690 within the home. For instance, the robotic devices 690 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 690 may include control processors that process output from the various sensors and control the robotic devices 690 to move along a path that reaches the desired destination and avoids obstacles. In this regard, the control processors detect walls or other obstacles in the home and guide movement of the robotic devices 690 in a manner that avoids the walls and other obstacles.

In addition, the robotic devices 690 may store data that describes attributes of the home. For instance, the robotic devices 690 may store a floorplan and/or a three-dimensional model of the home that enables the robotic devices 690 to navigate the home. During initial configuration, the robotic devices 690 may receive the data describing attributes of the home, determine a frame of reference to the data (e.g., a home or reference location in the home), and navigate the home based on the frame of reference and the data describing attributes of the home. Further, initial configuration of the robotic devices 690 also may include learning of one or more navigation patterns in which a user provides input to control the robotic devices 690 to perform a specific navigation action (e.g., fly to an upstairs bedroom and spin around while capturing video and then return to a home charging base). In this regard, the robotic devices 690 may learn and store the navigation patterns such that the robotic devices 690 may automatically repeat the specific navigation actions upon a later request.

In some examples, the robotic devices 690 may include data capture and recording devices. In these examples, the robotic devices 690 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 690 to take and store a biometric sample that can be used to identify the person (e.g., a biometric sample with DNA that can be used for DNA testing).

In some implementations, the robotic devices 690 may include output devices. In these implementations, the robotic devices 690 may include one or more displays, one or more speakers, and/or any type of output devices that allow the robotic devices 690 to communicate information to a nearby user.

The robotic devices 690 also may include a communication module that enables the robotic devices 690 to communicate with the control unit 610, each other, and/or other devices. The communication module may be a wireless communication module that allows the robotic devices 690 to communicate wirelessly. For instance, the communication module may be a Wi-Fi module that enables the robotic devices 690 to communicate over a local wireless network at the home. The communication module further may be a 900 MHz wireless communication module that enables the robotic devices 690 to communicate directly with the control unit 610. Other types of short-range wireless communication protocols, such as Bluetooth, Bluetooth LE, Z-wave, Zigbee, etc., may be used to allow the robotic devices 690 to communicate with other devices in the home. In some implementations, the robotic devices 690 may communicate with each other or with other devices of the system 600 through the network 605.

The robotic devices 690 further may include processor and storage capabilities. The robotic devices 690 may include any suitable processing devices that enable the robotic devices 690 to operate applications and perform the actions described throughout this disclosure. In addition, the robotic devices 690 may include solid-state electronic storage that enables the robotic devices 690 to store applications, configuration data, collected sensor data, and/or any other type of information available to the robotic devices 690.

The robotic devices 690 are associated with one or more charging stations. The charging stations may be located at predefined home base or reference locations in the home. The robotic devices 690 may be configured to navigate to the charging stations after completion of tasks needed to be performed for the monitoring system 600. For instance, after completion of a monitoring operation or upon instruction by the control unit 610, the robotic devices 690 may be configured to automatically fly to and land on one of the charging stations. In this regard, the robotic devices 690 may automatically maintain a fully charged battery in a state in which the robotic devices 690 are ready for use by the monitoring system 600.

The charging stations may be contact based charging stations and/or wireless charging stations. For contact based charging stations, the robotic devices 690 may have readily accessible points of contact that the robotic devices 690 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 690 may charge through a wireless exchange of power. In these cases, the robotic devices 690 need only locate themselves closely enough to the wireless charging stations for the wireless exchange of power to occur. In this regard, the positioning needed to land at a predefined home base or reference location in the home may be less precise than with a contact based charging station. Based on the robotic devices 690 landing at a wireless charging station, the wireless charging station outputs a wireless signal that the robotic devices 690 receive and convert to a power signal that charges a battery maintained on the robotic devices 690.

In some implementations, each of the robotic devices 690 has a corresponding and assigned charging station such that the number of robotic devices 690 equals the number of charging stations. In these implementations, the robotic devices 690 always navigate to the specific charging station assigned to that robotic device. For instance, a first robotic device may always use a first charging station and a second robotic device may always use a second charging station.

In some examples, the robotic devices 690 may share charging stations. For instance, the robotic devices 690 may use one or more community charging stations that are capable of charging multiple robotic devices 690. The community charging station may be configured to charge multiple robotic devices 690 in parallel. The community charging station may be configured to charge multiple robotic devices 690 in serial such that the multiple robotic devices 690 take turns charging and, when fully charged, return to a predefined home base or reference location in the home that is not associated with a charger. The number of community charging stations may be less than the number of robotic devices 690.

In addition, the charging stations may not be assigned to specific robotic devices 690 and may be capable of charging any of the robotic devices 690. In this regard, the robotic devices 690 may use any suitable, unoccupied charging station when not in use. For instance, when one of the robotic devices 690 has completed an operation or is in need of battery charge, the control unit 610 references a stored table of the occupancy status of each charging station and instructs the robotic device to navigate to the nearest charging station that is unoccupied.

The system 600 further includes one or more integrated security devices 680. The one or more integrated security devices may include any type of device used to provide alerts based on received sensor data. For instance, the one or more control units 610 may provide one or more alerts to the one or more integrated security input/output devices 680.

Additionally, the one or more control units 610 may receive one or more sensor data from the sensors 620 and determine whether to provide an alert to the one or more integrated security input/output devices 680.

The sensors 620, the home automation controls 622, the camera 630, the thermostat 634, and the integrated security devices 680 may communicate with the controller 612 over communication links 624, 626, 628, 632, 638, and 684. The communication links 624, 626, 628, 632, 638, and 684 may be a wired or wireless data pathway configured to transmit signals from the sensors 620, the home automation controls 622, the camera 630, the thermostat 634, and the integrated security devices 680 to the controller 612. The sensors 620, the home automation controls 622, the camera 630, the thermostat 634, and the integrated security devices 680 may continuously transmit sensed values to the controller 612, periodically transmit sensed values to the controller 612, or transmit sensed values to the controller 612 in response to a change in a sensed value.

The communication links 624, 626, 628, 632, 638, and 684 may include a local network. The sensors 620, the home automation controls 622, the camera 630, the thermostat 634, and the integrated security devices 680, and the controller 612 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 660 is an electronic device configured to provide monitoring services by exchanging electronic communications with the control unit 610, the one or more user devices 640 and 650, and the central alarm station server 670 over the network 605. For example, the monitoring server 660 may be configured to monitor events generated by the control unit 610. In this example, the monitoring server 660 may exchange electronic communications with the network module 614 included in the control unit 610 to receive information regarding events detected by the control unit 610. The monitoring server 660 also may receive information regarding events from the one or more user devices 640 and 650.

In some examples, the monitoring server 660 may route alert data received from the network module 614 or the one or more user devices 640 and 650 to the central alarm station server 670. For example, the monitoring server 660 may transmit the alert data to the central alarm station server 670 over the network 605.

The monitoring server 660 may store sensor and image data received from the monitoring system and perform analysis of sensor and image data received from the monitoring system. Based on the analysis, the monitoring server 660 may communicate with and control aspects of the control unit 610 or the one or more user devices 640 and 650.

The monitoring server 660 may provide various monitoring services to the system 600. For example, the monitoring server 660 may analyze the sensor, image, and other data to determine an activity pattern of a resident of the home monitored by the system 600. In some implementations, the monitoring server 660 may analyze the data for alarm conditions or may determine and perform actions at the home by issuing commands to one or more of the controls 622, possibly through the control unit 610.

The monitoring server 660 can be configured to provide information (e.g., activity patterns) related to one or more residents of the home monitored by the system 600 (e.g., user 108). For example, one or more of the sensors 620, the home automation controls 622, the camera 630, the thermostat 634, and the integrated security devices 680 can collect data related to a resident including location information (e.g., if the resident is home or is not home) and provide location information to the thermostat 634.

The central alarm station server 670 is an electronic device configured to provide alarm monitoring service by exchanging communications with the control unit 610, the one or more user devices 640 and 650, and the monitoring server 660 over the network 605. For example, the central alarm station server 670 may be configured to monitor alerting events generated by the control unit 610. In this example, the central alarm station server 670 may exchange communications with the network module 614 included in the control unit 610 to receive information regarding alerting events detected by the control unit 610. The central alarm station server 670 also may receive information regarding alerting events from the one or more user devices 640 and 650 and/or the monitoring server 660.

The central alarm station server 670 is connected to multiple terminals 672 and 674. The terminals 672 and 674 may be used by operators to process alerting events. For example, the central alarm station server 670 may route alerting data to the terminals 672 and 674 to enable an operator to process the alerting data. The terminals 672 and 674 may include general-purpose computers (e.g., desktop personal computers, workstations, or laptop computers) that are configured to receive alerting data from a server in the central alarm station server 670 and render a display of information based on the alerting data. For instance, the controller 612 may control the network module 614 to transmit, to the central alarm station server 670, alerting data indicating that a sensor 620 detected motion from a motion sensor via the sensors 620. The central alarm station server 670 may receive the alerting data and route the alerting data to the terminal 672 for processing by an operator associated with the terminal 672. The terminal 672 may render a display to the operator that includes information associated with the alerting event (e.g., the lock sensor data, the motion sensor data, the contact sensor data, etc.) and the operator may handle the alerting event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more authorized user devices 640 and 650 are devices that host and display user interfaces. For instance, the user device 640 is a mobile device that hosts or runs one or more native applications (e.g., the home monitoring application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a home monitoring application 652. The home monitoring application 642 refers to a software/firmware program running on the corresponding mobile device that enables the user interface and features described throughout. The user device 640 may load or install the home monitoring application 642 based on data received over a network or data received from local media. The home monitoring application 642 runs on mobile devices platforms, such as iPhone, iPod touch, Blackberry, Google Android, Windows Mobile, etc. The home monitoring application 642 enables the user device 640 to receive and process image and sensor data from the monitoring system.

The user device 640 may be a general-purpose computer (e.g., a desktop personal computer, a workstation, or a laptop computer) that is configured to communicate with the monitoring server 660 and/or the control unit 610 over the network 605. The user device 640 may be configured to display a smart home user interface 652 that is generated by the user device 640 or generated by the monitoring server 660. For example, the user device 640 may be configured to display a user interface (e.g., a web page) provided by the monitoring server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640 and 650 communicate with and receive monitoring system data from the control unit 610 using the communication link 638. For instance, the one or more user devices 640 and 650 may communicate with the control unit 610 using various local wireless protocols such as Wi-Fi, Bluetooth, Z-wave, Zigbee, HomePlug (ethernet over power line), or wired protocols such as Ethernet and USB, to connect the one or more user devices 640 and 650 to local security and automation equipment. The one or more user devices 640 and 650 may connect locally to the monitoring system and its sensors and other devices. The local connection may improve the speed of status and control communications because communicating through the network 605 with a remote server (e.g., the monitoring server 660) may be significantly slower.

Although the one or more user devices 640 and 650 are shown as communicating with the control unit 610, the one or more user devices 640 and 650 may communicate directly with the sensors and other devices controlled by the control unit 610. In some implementations, the one or more user devices 640 and 650 replace the control unit 610 and perform the functions of the control unit 610 for local monitoring and long range/offsite communication.

In other implementations, the one or more user devices 640 and 650 receive monitoring system data captured by the control unit 610 through the network 605. The one or more user devices 640, 650 may receive the data from the control unit 610 through the network 605 or the monitoring server 660 may relay data received from the control unit 610 to the one or more user devices 640 and 650 through the network 605. In this regard, the monitoring server 660 may facilitate communication between the one or more user devices 640 and 650 and the monitoring system.

In some implementations, the one or more user devices 640 and 650 may be configured to switch whether the one or more user devices 640 and 650 communicate with the control unit 610 directly (e.g., through link 638) or through the monitoring server 660 (e.g., through network 605) based on a location of the one or more user devices 640 and 650. For instance, when the one or more user devices 640 and 650 are located close to the control unit 610 and in range to communicate directly with the control unit 610, the one or more user devices 640 and 650 use direct communication. When the one or more user devices 640 and 650 are located far from the control unit 610 and not in range to communicate directly with the control unit 610, the one or more user devices 640 and 650 use communication through the monitoring server 660.

Although the one or more user devices 640 and 650 are shown as being connected to the network 605, in some implementations, the one or more user devices 640 and 650 are not connected to the network 605. In these implementations, the one or more user devices 640 and 650 communicate directly with one or more of the monitoring system components and no network (e.g., Internet) connection or reliance on remote servers is needed.

In some implementations, the one or more user devices 640 and 650 are used in conjunction with only local sensors and/or local devices in a house. In these implementations, the system 600 includes the one or more user devices 640 and 650, the sensors 620, the home automation controls 622, the camera 630, and the robotic devices 690. The one or more user devices 640 and 650 receive data directly from the sensors 620, the home automation controls 622, the camera 630, and the robotic devices 690, and sends data directly to the sensors 620, the home automation controls 622, the camera 630, and the robotic devices 690. The one or more user devices 640, 650 provide the appropriate interfaces/processing to provide visual surveillance and reporting.

In other implementations, the system 600 further includes network 605 and the sensors 620, the home automation controls 622, the camera 630, the thermostat 634, and the robotic devices 690, and are configured to communicate sensor and image data to the one or more user devices 640 and 650 over network 605 (e.g., the Internet, cellular network, etc.). In yet another implementation, the sensors 620, the home automation controls 622, the camera 630, the thermostat 634, and the robotic devices 690 (or a component, such as a bridge/router) are intelligent enough to change the communication pathway from a direct local pathway when the one or more user devices 640 and 650 are in close physical proximity to the sensors 620, the home automation controls 622, the camera 630, the thermostat 634, and the robotic devices 690 to a pathway over network 605 when the one or more user devices 640 and 650 are farther from the sensors 620, the home automation controls 622, the camera 630, the thermostat 634, and the robotic devices 690.

In some examples, the system leverages GPS information from the one or more user devices 640 and 650 to determine whether the one or more user devices 640 and 650 are close enough to the sensors 620, the home automation controls 622, the camera 630, the thermostat 634, and the robotic devices 690 to use the direct local pathway or whether the one or more user devices 640 and 650 are far enough from the sensors 620, the home automation controls 622, the camera 630, the thermostat 634, and the robotic devices 690 that the pathway over network 605 is required.

In other examples, the system leverages status communications (e.g., pinging) between the one or more user devices 640 and 650 and the sensors 620, the home automation controls 622, the camera 630, the thermostat 634, and the robotic devices 690 to determine whether communication using the direct local pathway is possible. If communication using the direct local pathway is possible, the one or more user devices 640 and 650 communicate with the sensors 620, the home automation controls 622, the camera 630, the thermostat 634, and the robotic devices 690 using the direct local pathway. If communication using the direct local pathway is not possible, the one or more user devices 640 and 650 communicate with the sensors 620, the home automation controls 622, the camera 630, the thermostat 634, and the robotic devices 690 using the pathway over network 605.

In some implementations, the system 600 provides end users with access to images captured by the camera 630 to aid in decision making. The system 600 may transmit the images captured by the camera 630 over a wireless WAN network to the user devices 640 and 650. Because transmission over a wireless WAN network may be relatively expensive, the system 600 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "away" state, but set not to capture images when the alarm system is armed in a "home" state or disarmed. In addition, the camera 630 may be triggered to begin capturing images when the alarm system detects an event, such as an alarm event, a door-opening event for a door that leads to an area within a field of view of the camera 630, or motion in the area within the field of view of the camera 630. In other implementations, the camera 630 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   accessing, for a robotic device located at a property, map data associated with the property and that was stored in computer memory;
   obtaining sensor data captured by a sensor on the robotic device;
   using the map data and the sensor data, selecting, from a plurality of lighting scenarios each of which have corresponding map data for at least a portion of the property, a lighting scenario for at least a portion of the property, at least some of the lighting scenarios from the plurality of lighting scenarios having map data that represent first visual features for navigation that are different than second visual features represented by different map data for a different scenario dependent upon a corresponding light source; and
   using the lighting scenario for at least the portion of the property, configuring the robotic device for navigating the portion of the property.

2. The method of claim 1, wherein configuring the robotic device comprises:
   adjusting exposure settings of a camera of the robotic device using the lighting scenario;
   adjusting a position of a camera of the robotic device; or
   adjusting a position of the robotic device.

3. The method of claim 1, wherein configuring the robotic device comprises:
   modifying a planned navigation path for the robotic device.

4. The method of claim 3, wherein modifying the planned navigation path for the robotic device comprises:
   determining a navigation path that avoids one or more light transition areas in the property.

5. The method of claim 1, comprising:
   transmitting instructions to adjust the lighting scenario by changing a state of one or more light sources at the property that are separate from the robotic device.

6. The method of claim 5, comprising:
   determining to increase or decrease light of at least one light source of the property, wherein transmitting the instructions is responsive to determining to increase or decrease light of at least one light source of the property.

7. The method of claim 1, comprising:
   initiating navigation of at least a portion of the property using the robotic device;
   detecting, from the sensor data or the map data, a light transition area; and
   in response to detecting the light transition area, suspending the navigation.

8. The method of claim 7, wherein detecting the light transition area comprises detecting an area of the property that includes a dimly-lit portion and a well-lit portion.

9. The method of claim 8, wherein the dimly-lit portion is adjacent the well-lit portion.

10. The method of claim 1, comprising:
    requesting, from a system and using the lighting scenario for at least the portion of the property, a different version of the map data that is for the lighting scenario; and
    in response to requesting the different version of the map data, receiving, from the system, the different version of the map data that was selected using lighting scenario, wherein configuring the robotic device for navigating the portion of the property uses the different version of the map data that is for the lighting scenario.

11. The method of claim 1, wherein:
    accessing the map data comprises accessing data that indicates multiple light sources of the property that are separate from the robotic device;
    determining the lighting scenario comprises identifying a subset of the multiple light sources that provided light indicated by the sensor data; and
    configuring the robotic device for navigating the portion of the property uses data for the subset of the multiple light sources.

12. The method of claim 11, wherein identifying the subset of the multiple light sources responsible for the lighting scenario comprises:
    determining a current state of one or more light sources of the multiple light sources; and
    selecting, from among the one or more light sources, the subset of the multiple light sources for being in an on state.

13. One or more non-transitory computer-readable media storing instructions that, when executed by one or more computers, cause the one or more computers to perform operations comprising:
    receiving, for a robotic device located at a property, map data associated with the property and that was stored in computer memory;
    obtaining sensor data captured by a sensor on the robotic device;
    using the map data and the sensor data, selecting, from a plurality of lighting scenarios each of which have corresponding map data for at least a portion of the property, a lighting scenario for at least a portion of the property at least some of the lighting scenarios from the plurality of lighting scenarios having map data that represent first visual features for navigation that are different than second visual features represented by different map data for a different scenario dependent upon a corresponding light source; and
    using the lighting scenario for at least the portion of the property, configuring the robotic device for navigating the portion of the property.

14. The method of claim 1, wherein configuring the robotic device comprises configuring, by a control system that maintains data for the plurality of lighting scenarios or the robotic device, the robotic device for navigating the portion of the property using the lighting scenario for at least the portion of the property.

15. A system comprising one or more computers and one or more storage devices on which are stored instructions that are operable, when executed by the one or more computers, to cause the one or more computers to perform operations comprising:

receiving, for a robotic device located at a property, map data associated with the property and that was stored in computer memory;

obtaining sensor data captured by a sensor on the robotic device;

using the map data and the sensor data, selecting, from a plurality of lighting scenarios each of which have corresponding map data for at least a portion of the property, a lighting scenario for at least a portion of the property at least some of the lighting scenarios from the plurality of lighting scenarios having map data that represent first visual features for navigation that are different than second visual features represented by different map data for a different scenario dependent upon a corresponding light source; and using the lighting scenario for at least the portion of the property, configuring the robotic device for navigating the portion of the property.

16. The system of claim 15, wherein configuring the robotic device comprises:

adjusting exposure settings of a camera of the robotic device using the lighting scenario;

adjusting a position of a camera of the robotic device; or adjusting a position of the robotic device.

17. The system of claim 15, wherein configuring the robotic device comprises:

modifying a planned navigation path for the robotic device.

18. The system of claim 17, wherein modifying the planned navigation path for the robotic device comprises:

determining a navigation path that avoids one or more light transition areas in the property.

19. The system of claim 15, the operations comprising:

transmitting instructions to adjust the lighting scenario by changing a state of one or more light sources at the property that are separate from the robotic device.

20. The system of claim 19, the operations comprising:

determining to increase or decrease light of at least one light source of the property, wherein transmitting the instructions is responsive to determining to increase or decrease light of at least one light source of the property.

* * * * *